US012574776B2

(12) United States Patent
Hu et al.

(10) Patent No.: US 12,574,776 B2
(45) Date of Patent: Mar. 10, 2026

(54) INFORMATION TRANSMISSION METHOD AND RELATED DEVICE

(71) Applicant: Huawei Technologies Co., Ltd., Shenzhen (CN)

(72) Inventors: Xingxing Hu, Shanghai (CN); Jun Chen, Shanghai (CN); Hongping Zhang, Shenzhen (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 518 days.

(21) Appl. No.: 17/938,753

(22) Filed: Oct. 7, 2022

(65) Prior Publication Data

US 2023/0030697 A1 Feb. 2, 2023

Related U.S. Application Data

(63) Continuation of application No. PCT/CN2021/086209, filed on Apr. 9, 2021.

(30) Foreign Application Priority Data

Apr. 10, 2020 (CN) .......................... 202010281284.1

(51) Int. Cl.
*H04W 24/10* (2009.01)
*H04W 72/23* (2023.01)
(52) U.S. Cl.
CPC ........... *H04W 24/10* (2013.01); *H04W 72/23* (2023.01)

(58) Field of Classification Search
CPC .............. H04W 24/10; H04W 28/0236; H04L 47/283; H04B 17/104
See application file for complete search history.

(56) References Cited

U.S. PATENT DOCUMENTS

| | | | | |
|---|---|---|---|---|
| 2012/0106356 A1* | 5/2012 | Johansson | ............. | H04W 24/08 370/242 |
| 2015/0092579 A1* | 4/2015 | Li | .......... | H04W 24/10 370/252 |
| 2022/0030454 A1* | 1/2022 | Wang | ................. | H04L 41/0803 |
| 2023/0071803 A1* | 3/2023 | Liu | ........... | H04W 24/08 |

FOREIGN PATENT DOCUMENTS

| | | |
|---|---|---|
| CN | 106454921 A | 2/2017 |
| WO | 2016180154 A1 | 11/2016 |
| WO | 2019213924 A1 | 11/2019 |

OTHER PUBLICATIONS

3rd Generation Partnership Project; Technical Specification Group Radio Access Network; NR; Layer 2 Measurements (Release 16), 3GPP TS 38.314, Feb. 2020, 2 Pages, V0.0.4.

(Continued)

*Primary Examiner* — Charles C Jiang
*Assistant Examiner* — Ryan C Kavleski
(74) *Attorney, Agent, or Firm* — Slater Matsil, LLP

(57) ABSTRACT

Embodiments of this application disclose an information transmission method. The method in embodiments of this application includes: A core network device receives indication information and delay information, and the core network device may determine, based on the indication information, whether the delay information includes a terminal side delay or whether the terminal device supports measurement of the terminal side delay.

19 Claims, 13 Drawing Sheets

(56)                    References Cited

OTHER PUBLICATIONS

3rd Generation Partnership Project; Technical Specification Group Services and System Aspects; Management and orchestration; 5G performance measurements (Release 16), 3GPP TS 28.552, Mar. 2020, 173 Pages, V16.5.0.

3rd Generation Partnership Project; Technical Specification Group Radio Access Network; NR;Radio Resource Control (RRC) protocol specification (Release 15), 3GPP TS 38.331, Mar. 2020, 328 Pages, V15.9.0.

3rd Generation Partnership Project; Technical Specification Group Radio Access Network; NG-RAN; NG Application Protocol (NGAP) (Release 16), 3GPP TS 38.413, Mar. 2020, 341 Pages, V16.1.0.

3rd Generation Partnership Project; Technical Specification Group Radio Access Network; NG-RAN; PDU Session User Plane Protocol (Release 16), 3GPP TS 38.415, Mar. 2020, 14 Pages, V16.0.0.

Intel Corporation, "For SA5 LS (S5-196840) on QoS Monitoring for URLLC", 3GPP TSG-RAN WG3 Meeting #106, R3-197503, Nov. 18-22, 2019, 7 Pages, Reno, NV, USA.

Huawei, "E2E delay measurement for Qos monitoring for URLLC", 3GPP TSG-RAN WG3 #107-e, R3-200484, Feb. 24-Mar. 6, 2020, 8 Pages.

Intel Corporation, "QoS monitoring support for URLLC", 3GPP TSG-RAN WG3 Meeting #107-e, R3-201094, Feb. 24-Mar. 6, 2020, 6 Pages, Electronic Meeting.

* cited by examiner

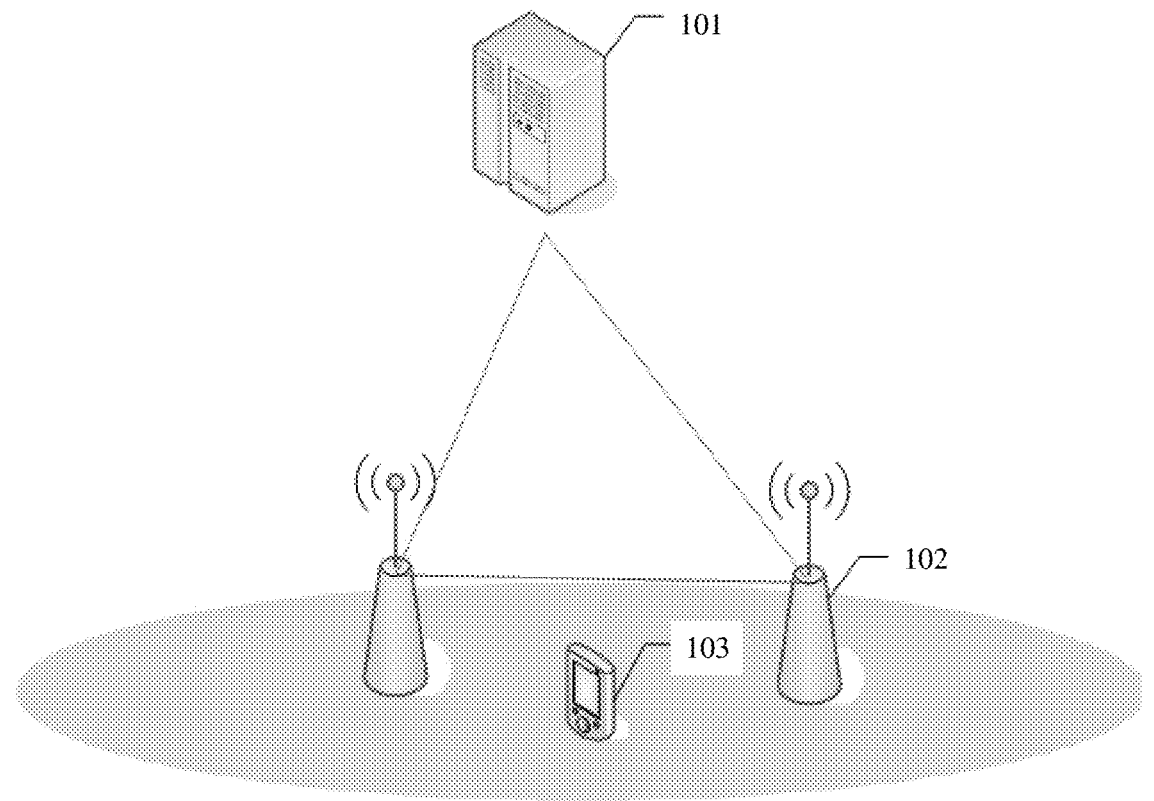
101
102
103
FIG. 1.1

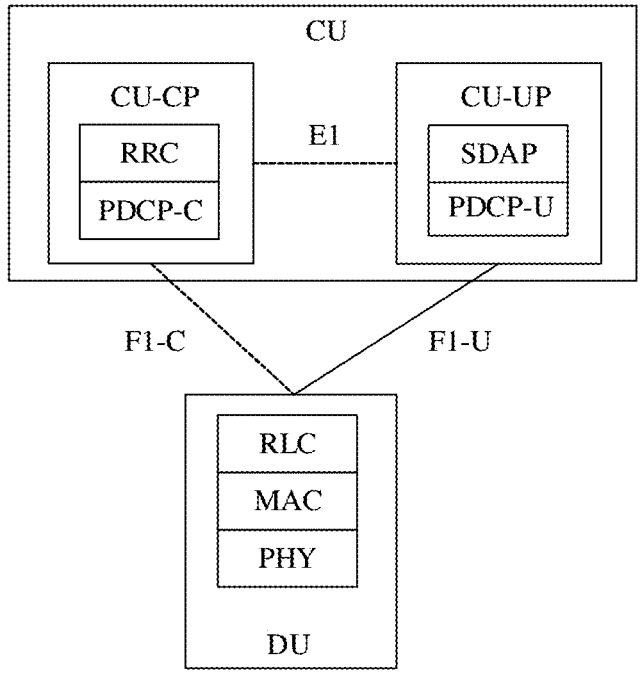
FIG. 1.2

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | QMP | DL Delay Ind. | UL Delay Ind. | D1 Ind. | 1 |
| Spare | | QoS Flow Identifier | | | | | | 1 |
| DL Sending Time Stamp Repeated | | | | | | | | 0 or 4 |
| DL Received Time Stamp | | | | | | | | 0 or 4 |
| UL Sending Time Stamp | | | | | | | | 0 or 4 |
| DL Delay Result | | | | | | | | 0 or 4 |
| UL Delay Result | | | | | | | | 0 or 4 |
| Padding | | | | | | | | 0–3 |

FIG. 6

INFORMATION TRANSMISSION METHOD AND RELATED DEVICE

CROSS-REFERENCE TO RELATED APPLICATIONS

This application is a continuation of International Application No. PCT/CN2021/086209, filed on Apr. 9, 2021, which claims priority to Chinese Patent Application No. 202010281284.1, filed on Apr. 10, 2020. The disclosures of the aforementioned applications are hereby incorporated by reference in their entireties.

TECHNICAL FIELD

Embodiments of this application relate to the Internet field, and in particular, to an information transmission method and a related device.

BACKGROUND

More services require low-delay performance to meet increasing communication demands. For example, a URLLC service requires a delay within 0.5 millisecond. To ensure service performance, an operator needs to know delay performance of a current network.

In a conventional technology, an access network device may provide a core network device with a delay, namely, delay information, of data transmission between a terminal device and the access network device.

The delay of the data transmission between the terminal device and the access network device includes several parts. The part that needs to be measured by the terminal device is referred to as a terminal-side delay. When obtaining the delay information, a core network needs to learn of specific parts of the delay information. Otherwise, the core network does not know a specific meaning of the delay when obtaining the delay information. However, some terminal devices do not support measurement of a terminal side delay due to a processing capability or another reason. Therefore, when obtaining the delay information, the core network needs to learn of the specific meaning of the delay information currently provided by the access network device.

SUMMARY

Embodiments of this application provide an information transmission method and a related device.

According to a first aspect of embodiments of this application, an information transmission method is provided. The method includes the following.

An access network device receives delay measurement information sent by a core network device, where the delay measurement information may indicate the access network device to provide delay information, and the delay information includes a delay of data transmission between a terminal device and the access network device; and the access network device sends indication information and the delay information to the core network device, where the indication information indicates whether the terminal device supports measurement of a terminal side delay, or indicates whether the delay information includes the terminal side delay.

The core network device may determine, by using the indication information, whether the delay information includes the terminal side delay, or whether the terminal device supports the measurement of the terminal side delay.

According to the first aspect of embodiments of this application, in a first implementation of the first aspect of embodiments of this application, after the access network device receives the delay measurement information sent by the core network device, the access network device detects, based on the delay measurement information, the delay of the data transmission between the terminal device and the access network device, to obtain the delay information, and sends the delay information to the core network device.

In this embodiment of this application, an occasion and a method for obtaining the delay information by the access network device are provided.

According to the first implementation of the first aspect of embodiments of this application, in a second implementation of the first aspect of embodiments of this application, a process in which the access network device detects the delay of the data transmission between the terminal device and the access network device may include:

If the terminal device supports the measurement of the terminal side delay, the access network device sends a delay measurement message to the terminal device, where the delay measurement message indicates the terminal device to measure the terminal side delay; and when the terminal device supports the measurement of the terminal side delay, the delay information includes the terminal side delay.

In this embodiment of this application, a specific process in which the access network device detects the delay of the data transmission between the terminal device and the access network device is provided.

According to the second implementation of the first aspect of embodiments of this application, in a third implementation of the first aspect of embodiments of this application, after the access network device sends the delay measurement message to the terminal device, when the access network device determines, within a preset periodicity, that the terminal side delay is received from the terminal device, the access network device obtains the delay information based on the terminal side delay received within the preset periodicity; or when the access network device determines, within the preset periodicity, that the terminal side delay is not received from the terminal device, the access network device obtains the delay information based on the terminal side delay received beyond the preset periodicity.

In this embodiment of this application, a method for obtaining, by the access network device, the delay information including the terminal side delay is provided, so that flexibility of the solution is improved.

According to any one of the first aspect to the third implementation of the first aspect of embodiments of this application, in a fourth implementation of the first aspect of embodiments of this application, the indication information may be carried in a control plane message sent by the access network device to the core network device, or may be carried in user plane data sent by the access network device to the core network device.

In this embodiment of this application, a plurality of manners of carrying the indication information is provided, so that the flexibility of the solution is improved.

According to any one of the first aspect to the fourth implementation of the first aspect of embodiments of this application, in a fifth implementation of the first aspect of embodiments of this application, the indication information may include first indication information and second indication information, the first indication information indicates that the terminal device supports the measurement of the terminal side delay or the delay information includes the terminal side delay, and the second indication information indicates that the terminal device does not support the measurement of the terminal side delay or the delay information does not include the terminal side delay.

In this embodiment of this application, a possible form of the indication information is provided, so that implementability of the solution is improved.

According to a second aspect of embodiment of this application, an information transmission method is provided. The method includes:

A core network device sends delay measurement information to an access network device, where the delay measurement information may indicate the access network device to provide delay information, and the delay information includes a delay of data transmission between a terminal device and the access network device; and the core network device receives indication information and the delay information from the access network device, where the indication information indicates whether the terminal device supports measurement of a terminal side delay, or indicates whether the delay information includes the terminal side delay.

The core network device may determine, by using the indication information, whether the delay information includes the terminal side delay, or whether the terminal device supports the measurement of the terminal side delay.

According to the second aspect of embodiments of this application, in a first implementation of the second aspect of embodiments of this application, the indication information may be carried in a control plane message sent by the access network device to the core network device, or may be carried in user plane data sent by the access network device to the core network device.

In this embodiment of this application, a possible form of the indication information is provided, so that implementability of the solution is improved.

According to the second aspect or the first implementation of the second aspect of embodiments of this application, in a second implementation of the second aspect of embodiments of this application, the indication information may include first indication information and second indication information, the first indication information indicates that the terminal device supports the measurement of the terminal side delay or the delay information includes the terminal side delay, and the second indication information indicates that the terminal device does not support the measurement of the terminal side delay or the delay information does not include the terminal side delay.

In this embodiment of this application, a possible form of the indication information is provided, so that the implementability of the solution is improved.

According to a third aspect of embodiments of this application, an information transmission method is provided. The method includes:

A terminal device sends indication information to a core network device, where the indication information indicates whether the terminal device supports measurement of a terminal side delay, or indicates whether delay information includes the terminal side delay, and the delay information includes a delay of data transmission between the terminal device and an access network device.

The core network device may determine, by using the indication information, whether the delay information includes the terminal side delay, or whether the terminal device supports the measurement of the terminal side delay.

According to the third aspect of embodiments of this application, in a first implementation of the third aspect of embodiments of this application, when the indication information indicates that the terminal device supports the measurement of the terminal side delay, or indicates that the delay information includes the terminal side delay, the terminal device receives a delay measurement message from the access network device, measures the terminal side delay based on the delay measurement message; and sends the terminal side delay measured by the terminal device to the access network device.

According to the first implementation of the third aspect of embodiments of this application, in a second implementation of the third aspect of embodiments of this application, a condition in which the terminal device sends the terminal side delay to the access network device includes: When the terminal side delay satisfies a preset condition, the terminal device sends the terminal side delay to the access network device, where the preset condition may be that the terminal side delay is beyond a preset delay range.

In this embodiment of this application, the terminal device sends the terminal side delay to the access network device only when the terminal side delay is beyond the preset delay range. When the terminal side delay detected by the terminal device belongs to the preset delay range, a quantity of times of data transmission between the terminal device and the access network device is reduced, and network resources are saved.

According to any one of the third aspect to the second implementation of the third aspect of embodiments of this application, in a third implementation of the third aspect of embodiments of this application, the indication information may include third indication information and fourth indication information, the third indication information indicates that the terminal device supports the measurement of the terminal side delay or the delay information includes the terminal side delay, and the fourth indication information indicates that the terminal device does not support the measurement of the terminal side delay or the delay information does not include the terminal side delay.

In this embodiment of this application, a possible form of the indication information is provided, so that implementability of the solution is improved.

According to a fourth aspect of embodiments of this application, an information transmission method is provided. The method includes:

A core network device receives indication information from a terminal device, where the indication information indicates whether the terminal device supports measurement of a terminal side delay, or indicates whether delay information includes the terminal side delay, and the delay information may include a delay of data transmission between the terminal device and an access network device.

The core network device may determine, by using the indication information, whether the delay information includes the terminal side delay, or whether the terminal device supports the measurement of the terminal side delay.

According to the fourth aspect of embodiments of this application, in a first implementation of the fourth aspect of embodiments of this application, the core network device may send delay measurement information to the access network device, where the delay measurement information indicates the access network device to provide the delay information; and the core network device receives the delay information from the access network device.

In this embodiment of this application, a manner in which the core network device obtains the delay information is provided.

According to the fourth aspect or the first implementation of the fourth aspect of embodiments of this application, in a second implementation of the fourth aspect of embodiments of this application, the indication information includes third indication information and fourth indication information, the third indication information indicates that the terminal device supports the measurement of the terminal side delay or the delay information includes the terminal side delay, and the fourth indication information indicates that the terminal device does not support the measurement of the terminal side delay or the delay information does not include the terminal side delay.

In this embodiment of this application, a possible form of the indication information is provided, so that implementability of the solution is improved.

According to a fifth aspect of embodiments of this application, an information transmission method is provided. The method includes:

An access network device receives delay measurement information from a core network device or a first network device, where the delay measurement information indicates the access network device to provide delay information, the delay information includes a delay of data transmission between a terminal device and the access network device, and the first network device includes an operation, administration and maintenance (OAM) device; and the access network device sends indication information and the delay information to the first network device, where the indication information indicates whether the terminal device supports measurement of a terminal side delay, or indicates whether the delay information includes the terminal side delay.

According to the fifth aspect of embodiments of this application, in a first implementation of the fifth aspect of embodiments of this application, the access network device detects, based on the delay measurement information, the delay of the data transmission between the terminal device and the access network device, to obtain the delay information, and sends the delay information to the first network device.

In this embodiment of this application, an occasion and a method for obtaining the delay information by the access network device are provided.

According to the first implementation of the fifth aspect of embodiments of this application, in a second implementation of the fifth aspect of embodiments of this application, a process in which the access network device detects the delay of the data transmission between the terminal device and the access network device may include:

If the terminal device supports the measurement of the terminal side delay, the access network device sends a delay measurement message to the terminal device, where the delay measurement message indicates the terminal device to measure the terminal side delay; and when the terminal device supports the measurement of the terminal side delay, the delay information includes the terminal side delay.

In this embodiment of this application, a specific process in which the access network device detects the delay of the data transmission between the terminal device and the access network device is provided.

According to the second implementation of the fifth aspect of embodiments of this application, in a third implementation of the fifth aspect of embodiments of this application, after the access network device sends the delay measurement message to the terminal device, when the access network device determines, within a preset periodicity, that the terminal side delay is received from the terminal device, the access network device obtains the delay information based on the terminal side delay received within the preset periodicity; or when the access network device determines, within the preset periodicity, that the terminal side delay is not received from the terminal device, the access network device obtains the delay information based on the terminal side delay received beyond the preset periodicity.

In this embodiment of this application, a method for obtaining, by the access network device, the delay information including the terminal side delay is provided, so that flexibility of the solution is improved.

According to any one of the fifth aspect to the third implementation of the fifth aspect of embodiments of this application, in a fourth implementation of the fifth aspect of embodiments of this application, the indication information may be carried in user plane data sent by the access network device to the first network device.

In this embodiment of this application, a manner of carrying the indication information is provided, so that implementability of the solution is improved.

According to any one of the fifth aspect to the fourth implementation of the fifth aspect of embodiments of this application, in a fifth implementation of the fifth aspect of embodiments of this application, the indication information may include first indication information and second indication information, the first indication information indicates that the terminal device supports the measurement of the terminal side delay or the delay information includes the terminal side delay, and the second indication information indicates that the terminal device does not support the measurement of the terminal side delay or the delay information does not include the terminal side delay.

In this embodiment of this application, a possible form of the indication information is provided, so that the implementability of the solution is improved.

According to a sixth aspect of embodiments of this application, an information transmission method is provided. The method includes:

A terminal device receives a delay measurement message from an access network device, and the terminal device measures a terminal side delay based on the delay measurement message. When the terminal side delay satisfies a preset condition, the terminal device sends the terminal side delay to the access network device, where the preset condition may be that the terminal side delay is beyond a preset delay range.

In this embodiment of this application, the terminal device sends the terminal side delay to the access network device only when the terminal side delay is beyond the preset delay range. When the terminal side delay detected by the terminal device belongs to the preset delay range, a quantity of times of data transmission between the terminal device and the access network device is reduced, and network resources are saved.

According to a seventh aspect of embodiments of this application, an information transmission method is provided. The method includes:

An access network device sends a delay measurement message to a terminal device, where the delay measurement message indicates the terminal device to measure a terminal side delay; and when the access network device determines, within a preset periodicity, that the terminal side delay is received from the terminal device, the access network device obtains delay information based on the terminal side delay received within the preset periodicity; or when the access network device determines, within the preset periodicity, that the terminal side delay is not received from the terminal device, the access network device obtains the delay information based on the terminal side delay received beyond the preset periodicity; and the access network device sends the delay information to a core network device.

In this embodiment of this application, the terminal device sends the terminal side delay to the access network device only when the terminal side delay is beyond a preset delay range. When the terminal side delay detected by the terminal device belongs to the preset delay range, a quantity of times of data transmission between the terminal device and the access network device is reduced, and network resources are saved.

According to an eighth aspect of embodiments of this application, an access network device is provided. The access network device includes a processor, configured to implement the method according to any one of the first aspect or the possible implementations of the first aspect, the method according to any one of the fifth aspect or the possible implementations of the fifth aspect, and the method according to any one of the seventh aspect or the possible implementations of the seventh aspect. Optionally, the access network device includes a memory, configured to store instructions and/or data. The memory is coupled to the processor. When the processor executes the instructions stored in the memory, the method according to any one of the first aspect or the possible implementations of the first aspect, the method according to any one of the fifth aspect or the possible implementations of the fifth aspect, and the method according to any one of the seventh aspect or the possible implementations of the seventh aspect may be implemented. The access network device may further include a communication interface. The communication interface is configured to receive and send information or data. For example, the communication interface may be a transceiver, an interface circuit, a bus, a module, a pin, or a communication interface of another type.

In a possible design, the access network device includes a processor and an interface circuit. The interface circuit is configured to: receive a signal from a communication apparatus other than the access network device, and transmit the signal to the processor; or send a signal from the processor to a communication apparatus other than the access network device, the processor is configured to implement, by using a logic circuit or executing code instructions, the method according to any one of the first aspect or the possible implementations of the first aspect, the method according to any one of the fifth aspect or the possible implementations of the fifth aspect, and the method according to any one of the seventh aspect or the possible implementations of the seventh aspect.

According to a ninth aspect of embodiments of this application, a core network device is provided. The core network device includes a processor, configured to implement the method according to any one of the second aspect or the possible implementations of the second aspect, or the method according to any one of the fourth aspect or the possible implementations of the fourth aspect. Optionally, the core network device includes a memory, configured to store instructions and/or data. The memory is coupled to the processor. When the processor executes the instructions stored in the memory, the method according to any one of the second aspect or the possible implementations of the second aspect, and the method according to any one of the fourth aspect or the possible implementations of the fourth aspect may be implemented. The core network device may further include a communication interface. The communication interface is configured to receive and send information or data. For example, the communication interface may be a transceiver, an interface circuit, a bus, a module, a pin, or a communication interface of another type.

In a possible design, the core network device includes a processor and an interface circuit. The interface circuit is configured to: receive a signal from a communication apparatus other than the core network device, and transmit the signal to the processor; or send a signal from the processor to a communication apparatus other than the core network device, the processor is configured to implement, by using a logic circuit or executing code instructions, the method according to any one of the second aspect or the possible implementations of the second aspect, and the method according to any one of the fourth aspect or the possible implementations of the fourth aspect.

According to a tenth aspect of embodiments of this application, a terminal device is provided. The terminal device includes a processor, configured to implement the method according to any one of the third aspect or the possible implementations of the third aspect, and the method according to any one of the sixth aspect or the possible implementations of the sixth aspect. Optionally, the terminal device includes a memory, configured to store instructions and/or data. The memory is coupled to the processor. When the processor executes the instructions stored in the memory, the method according to any one of the third aspect or the possible implementations of the third aspect, and the method according to any one of the sixth aspect or the possible implementations of the sixth aspect may be implemented. The terminal device may further include a communication interface. The communication interface is configured to receive and send information or data. For example, the communication interface may be a transceiver, an interface circuit, a bus, a module, a pin, or a communication interface of another type.

In a possible design, the terminal device includes a processor and an interface circuit. The interface circuit is configured to: receive a signal from a communication apparatus other than the terminal device, and transmit the signal to the processor; or send a signal from the processor to a communication apparatus other than the terminal device, the processor is configured to implement, by using a logic circuit or executing code instructions, the method according to any one of the third aspect or the possible implementations of the third aspect, and the method according to any one of the sixth aspect or the possible implementations of the sixth aspect.

According to an eleventh aspect of embodiments of this application, an access network device is provided. The access network device includes: a receiving unit, configured to receive delay measurement information from a core network device, where the delay measurement information indicates the access network device to provide delay information, and the delay information includes a delay of data transmission between a terminal device and the access network device; and a sending unit, configured to send indication information and the delay information to the core network device, where the indication information indicates whether the terminal device supports measurement of a terminal side delay, or indicates whether the delay information includes the terminal side delay. The access network device may further include a detection unit, configured to detect the delay of the data transmission between the terminal device and the access network device, to obtain the delay information; and specifically configured to: if the terminal device supports the measurement of the terminal side delay, send a delay measurement message to the terminal device, where the delay measurement message indicates the terminal device to measure the terminal side delay, and the delay information includes the terminal side delay; and a determining unit, configured to: when the access network device determines, within a preset periodicity, that the terminal side delay is received from the terminal device, obtain the delay information based on the terminal side delay received within the preset periodicity; or when the access network device determines, within the preset periodicity, that the terminal side delay is not received from the terminal device, obtain the delay information based on the terminal side delay received beyond the preset periodicity.

In this embodiment of this application, the units of the access network device may be configured to perform functions of the method according to the first aspect and the implementations of the first aspect.

According to a twelfth aspect of embodiments of this application, a core network device is provided. The core network device includes: a sending unit, configured to send delay measurement information to an access network device, where the delay measurement information indicates the access network device to provide delay information, and the delay information includes a delay of data transmission between a terminal device and the access network device; and a receiving unit, configured to receive indication information and the delay information from the access network device, where the indication information indicates whether the terminal device supports measurement of a terminal side delay, or indicates whether the delay information includes the terminal side delay.

In this embodiment of this application, the units of the core network device may be configured to perform functions of the method according to the second aspect and the implementations of the second aspect.

According to a thirteenth aspect of embodiments of this application, a terminal device is provided. The terminal device includes: a sending unit, configured to send indication information to a core network device, where the indication information indicates whether the terminal device supports measurement of a terminal side delay, or indicates whether delay information includes the terminal side delay, and the delay information includes a delay of data transmission between the terminal device and an access network device. The sending unit may be further configured to send the terminal side delay to the access network device, and is specifically configured to: when the terminal side delay satisfies a preset condition, send the terminal side delay to the access network device, where the preset condition includes that the terminal side delay is beyond a preset delay range. The terminal device may further include a receiving unit, configured to: when the indication information indicates that the terminal device supports the measurement of the terminal side delay, or indicates that the delay information includes the terminal side delay, receive a delay measurement message from the access network device; and a measurement unit, configured to measure the terminal side delay.

In this embodiment of this application, the units of the terminal device may be configured to perform functions of the method according to the third aspect and the implementations of the third aspect.

According to a fourteenth aspect of embodiments of this application, a core network device is provided. The core network device includes: a receiving unit, configured to receive indication information from a terminal device, where the indication information indicates whether the terminal device supports measurement of a terminal side delay, or indicates whether delay information includes the terminal side delay, and the delay information includes a delay of data transmission between the terminal device and an access network device.

In this embodiment of this application, the units of the core network device may be configured to perform functions of the method according to the fourth aspect and the implementations of the fourth aspect.

According to a fifteenth aspect of embodiments of this application, an access network device is provided. The access network device includes: a receiving unit, configured to receive delay measurement information from a core network device or a first network device, where the delay measurement information indicates the access network device to provide delay information, the delay information includes a delay of data transmission between a terminal device and the access network device; and a sending unit, configured to send indication information and the delay information to the first network device, where the indication information indicates whether the terminal device supports measurement of a terminal side delay, or indicates whether the delay information includes the terminal side delay.

In this embodiment of this application, the units of the access network device may be configured to perform functions of the method according to the fifth aspect and the implementations of the fifth aspect.

According to a sixteenth aspect of embodiments of this application, a terminal device is provided. The terminal device includes: a receiving unit, configured to receive a delay measurement message from an access network device; a measurement unit, configured to measure a terminal side delay; and a sending unit, configured to: when the terminal side delay satisfies a preset condition, send the terminal side delay to the access network device, where the preset condition includes that the terminal side delay is beyond a preset delay range.

In this embodiment of this application, the units of the terminal device may be configured to perform functions of the method according to the sixth aspect and the implementations of the sixth aspect.

According to a seventeenth aspect of embodiments of this application, an access network device is provided. The access network device includes: a sending unit, configured to send a delay measurement message to a terminal device, where the delay measurement message indicates the terminal device to measure a terminal side delay, and further configured to send delay information to a core network device; and a determining unit, configured to: when the access network device determines, within a preset periodicity, that the terminal side delay is received from the terminal device, obtain the delay information based on the terminal side delay received within the preset periodicity; or when the access network device determines, within the preset periodicity, that the terminal side delay is not received from the terminal device, obtain the delay information based on the terminal side delay received beyond the preset periodicity.

In this embodiment of this application, the units of the access network device may be configured to perform functions of the method according to the seventh aspect and the implementations of the seventh aspect.

According to an eighteenth aspect of embodiments of this application, a computer-readable storage medium is provided. The computer-readable storage medium stores a computer program or instructions. When the computer program is executed or the instructions are executed, the method according to any one of the first aspect or the possible implementations of the first aspect to the method according to any one of the seventh aspect or the possible implementations of the seventh aspect are implemented.

According to a nineteenth aspect of embodiments of this application, a computer program product including instructions is provided. When the instructions are run, the method according to any one of the first aspect or the possible implementations of the first aspect to the method according to any one of the seventh aspect or the possible implementations of the seventh aspect are implemented.

According to a twentieth aspect of embodiments of this application, a computer program is provided. The computer program includes code or instructions. When the code is run or the instructions are run, the method according to any one of the first aspect or the possible implementations of the first aspect to the method according to any one of the seventh aspect or the possible implementations of the seventh aspect are implemented.

According to a twenty-first aspect of embodiments of this application, a chip system is provided. The chip system includes a processor, and may further include a memory, to implement the method according to any one of the first aspect or the possible implementations of the first aspect to the method according to any one of the seventh aspect or the possible implementations of the seventh aspect. The chip system may include a chip, or may include the chip and another discrete component.

According to a twenty-second aspect of embodiments of this application, a communication system is provided. The system includes the devices (for example, the access network device, the core network device, and/or the terminal device) included in any one of the eighth aspect to the seventeenth aspect.

BRIEF DESCRIPTION OF THE DRAWINGS

FIG. 1.1 is a schematic diagram of an architecture of a system according to an embodiment of this application;

FIG. 1.2 is a schematic diagram of a centralized unit-distributed unit architecture according to an embodiment of this application;

FIG. 6 is a schematic diagram of some parameters of a packet in which delay information is located according to an embodiment of this application;

DETAILED DESCRIPTION OF ILLUSTRATIVE EMBODIMENTS

Figure 2:
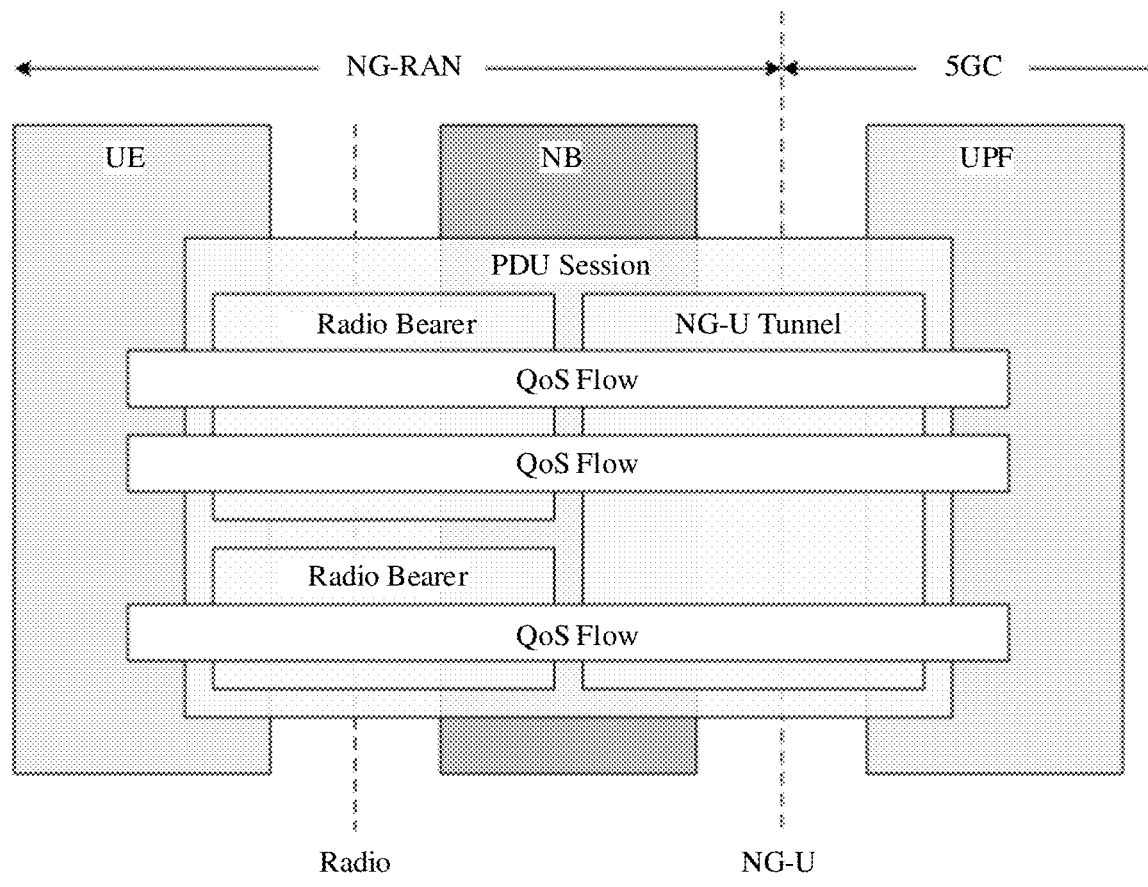
FIG. 2 is a schematic diagram of a quality of service architecture based on a quality of service flow according to an embodiment of this application.

The following clearly describes technical solutions in embodiments of this application with reference to the accompanying drawings in embodiments of this application. It is clear that the described embodiments are some but not all of embodiments of this application.

The technical solutions provided in embodiments of this application may be applied to various communication systems, for example, a long term evolution (LTE) system, a 5th generation (5G) mobile communication system, a wireless fidelity (Wi-Fi) system, a future communication system, or a system integrating a plurality of communication systems. This is not limited in embodiments of this application. 5G may also be referred to as new radio (NR).

The technical solutions provided in embodiments of this application may be applied to various communication scenarios, for example, one or more of the following communication scenarios: enhanced mobile broadband (eMBB), ultra-reliable low-latency communication (URLLC), machine type communication (MTC), massive machine-type communications (mMTC), device-to-device (D2D), vehicle to everything (V2X), vehicle to vehicle (V2V), internet of things (IoT), and the like.

The technical solutions provided in embodiments of this application may be applied to communication between communication devices. Communication between communication devices may include communication between a network device and a terminal device, communication between network devices, and/or communication between terminal devices. In embodiments of this application, the term "communication" may also be described as "transmission", "information transmission", "signal transmission", or the like. This is not specifically limited herein. The transmission may include sending and/or receiving. In embodiments of this application, communication between a network device and a terminal device is used as an example to describe the technical solutions. A person skilled in the art may also apply the technical solutions to other communication between a scheduling entity and a subordinate entity, for example, communication between a macro base station and a micro base station, for example, communication between a first terminal device and a second terminal device. The scheduling entity may allocate air interface resources to the subordinate entity. The air interface resources include one or more of the following resources: time-domain resources, frequency-domain resources, code resources, and spatial resources. In embodiments of this application, "a plurality of" may be two, three, four, or more types. This is not limited in embodiments of this application.

FIG. 1.1 is a schematic diagram of an architecture of a communication system to which an embodiment of this application may be applied. The communication system includes: a core network device 101, an access network device 102, and a terminal device 103.

The core network device 101 is a device on a core network (CN) that provides service support for a terminal. Currently, examples of some core network devices are: an access and mobility management function (AMF) entity, a session management function (SMF) entity, and a user plane function (UPF) entity. Examples are not listed one by one herein. The AMF entity may be responsible for access management and mobility management of a terminal. The SMF entity may be responsible for session management, for example, session establishment of a user. The UPF entity may be a functional entity on a user plane, and is mainly responsible for a connection to an external network. It should be noted that an entity in this application may also be referred to as a network element or a functional entity. For example, the AMF entity may also be referred to as an AMF network element or an AMF functional entity. For another example, the SMF entity may also be referred to as an SMF network element or an SMF functional entity. This is not specifically limited herein.

The access network device 102 is a radio access network (RAN) node (or device) that connects a terminal to a wireless network, and may also be referred to as a base station. Currently, examples of some RAN nodes are: a further evolved NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In addition, in a network structure, the access network device may include a centralized unit (CU), a distributed unit (DU), or a RAN device including a centralized unit and a distributed unit. On the RAN device including the centralized unit and the distributed unit, protocol layers are split from a perspective of logical functions. Functions of some protocol layers are controlled by the centralized unit in a centralized manner, functions of some or all of the remaining protocol layers are distributed in the distributed unit, and the centralized unit controls the distributed unit in a centralized manner.

FIG. 1.2 is a schematic diagram of a centralized unit-distributed unit (CU-DU) architecture. A centralized unit and a distributed unit may be physically separated or deployed together. The centralized unit and the distributed unit may be obtained through division based on protocol layers. For example, in a possible division manner, the centralized unit is configured to perform functions of a radio resource control (RRC) layer, a service data adaptation (SDAP) layer (where this protocol layer is a protocol layer that exists only when an access network device is connected to a 5G core), and a packet data convergence protocol (PDCP) layer; while the distributed unit is configured to perform functions of a radio link control (RLC) layer, a medium access control (MAC) layer, and a physical (PHY) layer.

It may be understood that the foregoing division is merely an example, and the centralized unit and the distributed unit may alternatively be obtained through division in another manner. For example, the centralized unit or the distributed unit may have functions of more protocol layers through division. For example, the centralized unit or the distributed unit may alternatively have some processing functions of protocol layers through division.

In a possible implementation, some functions of the RLC layer and functions of protocol layers above the RLC layer are deployed on the centralized unit, and remaining functions of the RLC layer and functions of protocol layers below the RLC layer are deployed on the distributed unit.

In another possible implementation, functions of the centralized unit or the distributed unit may alternatively be obtained through division based on a service type or another system requirement. For example, division is performed based on a delay, a function whose processing time needs to satisfy a delay requirement is disposed on the distributed unit, and a function whose processing time does not need to satisfy the delay requirement is disposed on the centralized unit.

In still another possible implementation, the centralized unit may alternatively have one or more functions of a core network. One or more centralized units may be disposed together, or may be disposed separately. For example, the centralized unit may be disposed on a network side to facilitate centralized management. The distributed unit may have a plurality of radio frequency functions, or the radio frequency functions may be disposed remotely.

It should be understood that functions of the centralized unit and the distributed unit may be set based on a requirement during specific implementation. This is not limited in embodiments of this application. Functions of the centralized unit may be implemented by one entity or different functional entities. In a manner, the functions of the centralized unit may be further divided into control plane (CP) functions and user plane (UP) functions, in other words, the centralized unit may be divided into a CU-UP and a CU-CP. The CU-CP and the CU-UP may be implemented by different functional entities, or may be implemented by a same functional entity. The CU-CP and the CU-UP may be coupled to the distributed unit, to jointly complete functions of the access network device. In a possible implementation, the CU-CP is responsible for the control plane functions, and mainly includes the RRC layer and a PDCP-C layer. The PDCP-C layer is mainly responsible for encryption, decryption, integrity protection, data transmission, and the like of control plane data. The CU-UP is responsible for the user plane functions, and mainly includes the SDAP layer and a PDCP-U layer. The SDAP layer is mainly responsible for processing data of a core network device and mapping a data flow to a bearer. The PDCP-U layer is mainly responsible for encryption, decryption, integrity protection, header compression, serial number maintenance, data transmission, and the like on a data plane. In another possible implementation, the PDCP-C layer is further included in the CU-UP.

The core network device may communicate with the centralized unit (for example, the CU-UP and/or the CU-CP). For example, the CU-CP may communicate with the core network device through an Ng interface on behalf of the access network device. The CU-UP and the CU-CP may communicate with each other, for example, through an E1 interface. The CU-UP and the CU-CP may communicate with the distributed unit. For example, the CU-CP may communicate with the distributed unit through F1-C (a control plane), and the CU-UP may communicate with the distributed unit through F1-U (a user plane). A plurality of distributed units may share one centralized unit, and one distributed unit may also be connected to a plurality of centralized units (not shown in the figure). The centralized unit and the distributed unit may communicate with each other through an interface (for example, an F1 interface).

The terminal device 103 may also be referred to as user equipment (UE), a mobile station (MS), a mobile terminal (MT), or the like, and is a device that provides a voice and/or data connectivity for a user. For example, the terminal device 103 is a handheld device or a vehicle-mounted device that has a wireless connection function. Currently, some examples of the terminal device are a mobile phone , a tablet computer, a laptop computer, a palmtop computer, a mobile internet device (mobile internet device, MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, or a wireless terminal in a smart home.

In embodiments of this application, an apparatus configured to implement a function of the terminal device may be a terminal device, or may be an apparatus, for example, a chip system, that can support the terminal device in implementing the function. The apparatus may be deployed in the terminal device, or may be used together with the terminal device. In embodiments of this application, the chip system may include a chip, or may include the chip and another discrete component. In the technical solutions provided in embodiments of this application, the technical solutions provided in embodiments of this application are described using an example in which the apparatus configured to implement the function of the terminal device is a terminal device.

In a scenario of a 5th generation mobile communication technology (5th generation mobile network, 5G), a QoS architecture based on a quality of service (QoS) flow is shown in FIG. 2. The architecture is applicable for new radio (NR) to connect to a 5th generation core (5GC), and is further applicable for evolved universal terrestrial radio access (E-UTRA) to connect to the 5GC. For each UE, the 5GC establishes one or more protocol data unit (PDU) sessions for the UE. For each UE, a RAN establishes one or more data radio bearers (DRBs) for each PDU session.

A PDU session may be understood as a link that provides a PDU link service between a terminal and a data network (DN).

A QoS flow is data flows that have a same QoS requirement in one PDU session, and may be a plurality of internet protocol (IP) flows that have a same QoS requirement. A DRB may be understood as a data bearer between a base station and a terminal. Data packets in the data bearer have same forwarding processing.

More services require low-delay performance to meet increasing communication demands. For example, an ultra-reliable low-latency communication URLLC) service requires a delay within 0.5 ms. To ensure service performance, an operator needs to know delay performance of a current network. A core network device may include a core network user plane (UP) and a core network control plane (CP). A quality of service monitoring (QoS monitoring) function is introduced in a standard, to measure a transmission delay between an access network device and the core network user plane (for example, a UPF in a 5G core) and a transmission delay between the access network device and a terminal device. The core network device notifies, by using the control plane, the access network device to start the function (for example, a control plane message indicates that an uplink delay, a downlink delay, or an uplink delay and a downlink delay is/are to be measured). After the access network device receives the notification, the access network device sends a measurement result of the delay (an uplink or downlink measurement result, or an uplink and downlink measurement result) between the access network device and the terminal device to the core network device.

Figure 3:
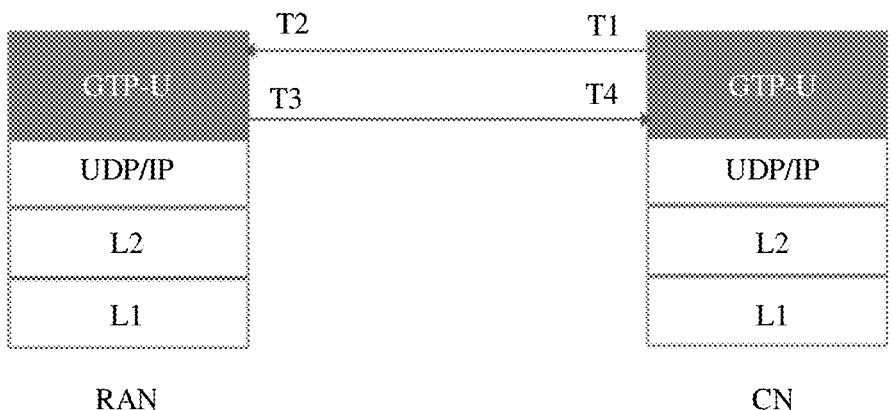
FIG. 3 is a schematic diagram of measuring delay information by a core network device according to an embodiment of this application.

FIG. 3 is a schematic diagram of measuring delay information by a core network device. A user plane of the core network device includes, in a general packet radio service (general packet radio service, GPRS) tunneling protocol-user plane (GTP-U) header corresponding to a monitoring packet, one piece of indication information, for example, a quality of service monitoring packet indicator (QoS monitoring packet indicator, QMP indicator), indicating that the monitoring packet is used to measure the delay information. In addition, the GTP-U header carries information about a moment (also referred to as a timestamp) T1 at which the user plane of the core network device sends the packet, and the information about the moment may be in a form of local time information.

After receiving the monitoring packet, an access network device records information about a moment T2 at which the packet is received. The access network device measures a delay between the access network device and a terminal device. In this embodiment of this application, there is no time sequence relationship between the measurement, performed by the access network device, of the delay between the access network device and the terminal device and reception, performed by the access network device, of the monitoring packet.

The access network device sends a measurement result of the delay between the access network device and the terminal device to the user plane of the core network device by using a monitoring response packet. A GTP-U header corresponding to the monitoring response packet also carries one piece of indication information, for example, a quality of service monitoring packet indicator, indicating that the monitoring response packet is used to measure the delay information. In addition, the monitoring response packet carries the information about the moments T1 and T2 and information about a moment T3 at which the access network device sends the monitoring response packet, and carries the measurement result of the delay (for example, an uplink delay (UL delay result) or a downlink delay (DL delay result)) between the access network device and the terminal device. In this embodiment of this application, the monitoring response packet may carry an uplink data packet, or may carry no uplink data packet.

The user plane of the core network device receives the monitoring response packet, and records information about a moment T4 at which the packet is received.

It should be noted that the measurement result of the delay between the access network device and the terminal device sent by the access network device to the user plane of the core network device may not be carried in the monitoring response packet (where the monitoring response packet carries the quality of service monitoring packet indicator, T1, T2, and T3) sent by the access network device to the core network device. To be specific, the monitoring response packet may not include the measurement result of the delay between the access network device and the terminal device; or a packet that is sent by the access network device to the user plane of the core network device and that carries the measurement result of the delay between the terminal device and the access network device does not carry the information about the moments T1, T2, and T3.

The user plane of the core network device calculates an uplink delay, a downlink delay, or an uplink delay and a downlink delay of data transmission between the access network device and the user plane of the core network device. An uplink delay between the terminal device and the user plane of the core network device is: Uplink delay between the terminal device and the access network device+ Uplink delay between the access network device and the user plane of the core network device. A downlink delay between the terminal device and the user plane of the core network device is: Downlink delay between the terminal device and the access network device+Downlink delay between the access network device and the user plane of the core network device. A round trip delay between the terminal device and the user plane of the core network device is: Uplink delay between the terminal device and the access network device+Downlink delay between the terminal device and access network device+Round trip delay between the access network device and the user plane of the core network device. A round trip delay between the access network device and the user plane of the core network device is: Uplink delay between the terminal device and the user plane of the core network device+Downlink delay between the terminal device and the user plane of the core network device.

For example, in a scenario in which the user plane of the core network device and the access network device are time synchronized, a downlink delay between the access network device and the user plane of the core network device is T2–T1, a downlink delay between the access network device and the user plane of the core network device is T4–T3, and a round trip delay between the access network device and the user plane of the core network device is T2–T1+T4–T3. In a scenario in which the user plane of the core network device and the access network device are not time synchronized, a round trip delay between the access network device and the user plane of the core network device is T4–T1–(T3–T2), and a downlink delay and an uplink delay are (T4–T1–(T3–T2))/2.

Figure 4:
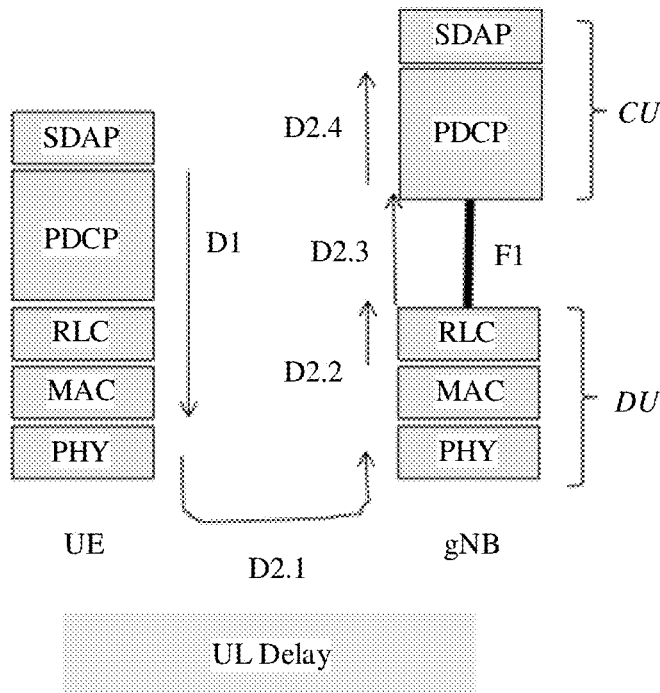
FIG. 4 is a schematic diagram of an uplink delay between an access network device and a terminal device according to an embodiment of this application.

The uplink delay between the access network device and the terminal device is divided into an uplink terminal side delay D1 and an uplink access network side delay D2. Refer to FIG. 4. The uplink terminal side delay is a packet data convergence protocol (PDCP) buffer delay on a terminal device side. A time period corresponding to the delay at the terminal device and is from a time point at which a data packet arrival from an upper layer of a PDCP layer to a time point at which an uplink grant for transmitting the data packet is available. The delay has included a delay from a time point at which the UE sends a scheduling request or performs random access to the time point at which the UE gets the uplink grant. To be specific, the uplink terminal side delay D1 is duration from a time point at which the terminal device receives data to a time point at which the terminal device sends the data to the access network device, and the terminal side delay is measured by the terminal device and reported to the access network device.

The uplink access network side delay D2 includes a hybrid automatic repeat request (HARQ) transmission or retransmission delay D2.1, an RLC side delay D2.2, an F1 interface delay D2.3, a PDCP layer reordering delay D2.4, and the like. D2.1 may be defined as a time period from a time point at which the terminal device sends a data packet to a time point at which the access network device successfully receives the data packet. D2.2 may be defined as a time period from a time point at which the first part of a radio link control (RLC) service data unit (SDU) is correctly received to a time point at which the RLC SDU is sent to the PDCP layer or a centralized unit (CU). D2.3 may be defined as a time period obtained by dividing a time period by 2, where the time period is obtained by subtracting a feedback delay of a packet on a DU side from a time period that is from a time point at which the CU sends the data packet to a distributed unit (DU) to a time point at which the CU receives a transmission status of the packet from the DU. D2.4 may be defined as a time period from a time point at which a PDCP SDU is received to a time point at which the PDCP SDU is sent to an upper layer.

Figure 5:
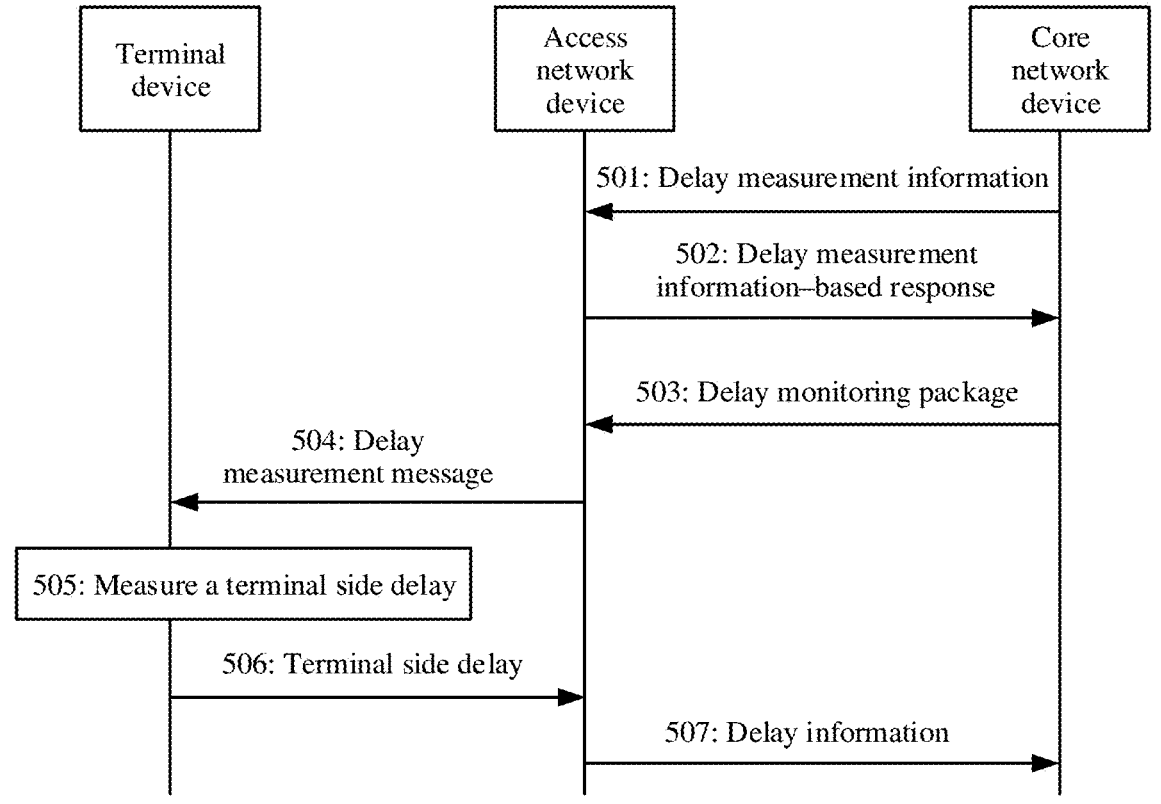
FIG. 5 is a schematic flowchart of an information transmission method according to an embodiment of this application.

Refer to FIG. 5. A procedure of an information transmission method according to an embodiment of this application includes steps 501 to 507. Details are as follows:

501: A core network device sends delay measurement information to an access network device.

The core network device sends the delay measurement information to the access network device, where the delay measurement information indicates the access network device to provide delay information, and the delay information is a delay of data transmission between a terminal device and the access network device.

The delay measurement information may be carried in the following information, for example, any one of a protocol data unit session resource setup request (PDU session resource setup request) message, a protocol data unit session resource modify request (PDU session resource modify request) message, or a resource handover request message. A specific message is not limited herein. Specifically, the delay measurement information may be carried in quality of service flow level quality of service parameters (QoS flow level QoS parameters) in the messages. Specific content of the delay measurement information may include a quality of service monitoring request (QoS monitoring request), and a value may be uplink, downlink, or uplink and downlink, indicating that an uplink delay, a downlink delay, or an uplink delay and a downlink delay of a corresponding QoS flow needs/need to be measured.

502: The access network device sends a delay measurement information-based response to the core network device.

After the access network device receives the delay measurement information, the access network device may return response information to the core network device. The response information indicates that the access network device receives the delay measurement information and supports measurement of the delay of the data transmission between the access network device and the terminal device.

The access network device returns the corresponding response based on the delay measurement information. For example, when the delay measurement information is carried in the protocol data unit session resource setup request (PDU session resource setup request) message, the response may be a protocol data unit session resource setup response (PDU session resource setup response) message. When the delay measurement information is carried in the protocol data unit session resource modify request (PDU session resource modify request) message, the response may be a protocol data unit session resource modify response (PDU session resource modify response) message. When the delay measurement information is carried in the resource handover request message, the response may be a handover request acknowledge message.

Optionally, the access network device sends indication information to the core network device, to indicate whether the terminal device supports measurement of a terminal side delay, or indicate whether the delay information includes the terminal side delay. In an implementation, the indication information may be carried in the delay measurement information-based response. The present invention does not limit a form of the indication information. For example, the indication information indicates that the delay information includes the terminal side delay. If the indication information is not carried, it indicates that the delay information does not include the terminal side delay. Alternatively, the indication information indicates that the terminal device supports the measurement of the terminal side delay. If the indication information is not carried, it indicates that the terminal device does not support the measurement of the terminal side delay. It should be noted that whether the terminal device supports the measurement of the terminal side delay is only an expression used in the present invention for ease of description. However, in practice, a protocol may only describe whether the terminal device supports delay measurement.

It may be understood that step 502 may not be performed during actual operation. The core network device may consider by default that the access network device receives the delay measurement information, and the access network device supports the measurement of the delay of the data transmission between the access network device and the terminal device.

503: The core network device sends a delay monitoring packet to the access network device.

In an implementation, the core network device may send the delay monitoring packet to the access network device, where the delay monitoring packet indicates the access network device to monitor the delay of the data transmission between the access network device and the terminal device. It may be understood that during actual operation, step 503 may not be performed. When the access network device receives the delay measurement information, the access network device monitors the delay of the data transmission between the access network device and the terminal device, and obtains the delay information.

504: The access network device sends a delay measurement message to the terminal device.

When the terminal device supports the measurement of the terminal side delay, the access network device sends the delay measurement message to the terminal device, to indicate the terminal device to measure the terminal side delay.

It should be noted that the terminal side delay may be an uplink terminal side delay, or may be a downlink terminal side delay. The uplink terminal side delay may be D1 described above. The downlink terminal side delay may be a delay from a time point at which a MAC layer of the terminal device correctly receives a data packet from the access network device to a time point at which the data packet is submitted to an upper layer of a PDCP layer.

The delay measurement message may be a radio resource control (RRC) reconfiguration message. To be specific, the access network device notifies, by using the RRC reconfiguration message, the terminal device to measure the terminal side delay. For example, another configuration (otherconfig) or a measurement configuration (measConfig) in the RRC reconfiguration message carries information for notifying the terminal device to perform delay measurement. For example, an identifier for performing delay measurement on a data radio bearer (DRB) is carried, that is, a DRB identifier (ID) is carried.

Optionally, the access network device may notify the terminal device to periodically measure the terminal side delay, and periodically report a corresponding periodic value of the terminal side delay. Duration of one periodicity may be 200 milliseconds, 500 milliseconds, or the like. Duration of one periodicity is not limited in this embodiment of this application.

505: The terminal device measures the terminal side delay.

After receiving the delay measurement message, the terminal device measures the terminal side delay. In a feasible implementation, the terminal device periodically measures the terminal side delay. Duration of one periodicity may be 200 milliseconds, 500 milliseconds, or the like. Duration of one periodicity is not limited in this embodiment of this application.

506: The terminal device sends the terminal side delay to the access network device.

In a scenario in which the terminal side delay does not change greatly, a quantity of times that a terminal device sends terminal side delays to the access network device can be reduced, and the access network device obtains the terminal side delay based on historical data, so that network resources occupied for reporting are reduced.

For example, the terminal device periodically measures and reports a terminal side delay. It is assumed that a terminal side delay value that currently needs to be reported, namely, a terminal side delay value measured in this periodicity, satisfies a preset delay range. The preset delay range may be obtained based on a terminal side delay reported by the terminal device last time. If the preset delay range is 0.9 to 1.1 times of the terminal side delay reported last time, or a difference between the terminal side delay value that currently needs to be reported and the terminal side delay reported last time is within 1 millisecond, in other words, if the difference between the value that currently needs to be reported and a value of the terminal side delay reported last time is within a delay range, the terminal device may not report a current measurement result; otherwise, the terminal device reports the measured terminal side delay. The delay range may be notified by the access network device to the terminal device (for example, the delay range is carried in the delay measurement information), or the delay range is fixed as specified in a protocol in advance. A manner in which the terminal device obtains the delay range is not limited herein. The access network device may further notify the terminal device whether the terminal device needs to determine whether the value is within the delay range. To be specific, the terminal device is notified to directly report the value or determine whether the difference between the value and the value reported last time is within one delay range.

Optionally, when the terminal device sends a terminal side delay to the access network device for the first time, the terminal device may compare the terminal side delay with an initial value. If a difference between the terminal side delay that currently needs to be reported and the initial value is within a delay range, the terminal device does not need to report a current measurement result; otherwise, the terminal device reports the current measurement result. The initial value may be notified by the access network device to the terminal device (for example, the initial value is carried in the delay measurement message), or the initial value is fixed as specified in a protocol in advance. A manner in which the terminal device obtains the initial value is not limited herein.

Optionally, in this embodiment, the terminal device may compare a terminal side delay reported each time with the initial value. If a difference between a terminal side delay that currently needs to be reported and the initial value is within one delay range, the terminal device does not need to report a current terminal side delay measurement result; otherwise, the terminal device reports the current terminal side delay measurement result.

507: The access network device sends the delay information to the core network device.

FIG. 6 is a schematic diagram of some parameters of a packet in which the delay information is located. The access network device sends the delay information to the core network device. A QMP is the foregoing quality of service monitoring packet indicator (QMP indicator). A DL delay indicator (DL delay Ind. for short) indicates whether the packet includes a measurement result of a downlink delay (DL Delay Result) between the access network device and the terminal device. A UL delay indicator (UL delay Ind. for short) indicates whether the packet includes a measurement result of an uplink delay (UL Delay Result) between the access network device and the terminal device. A QoS flow identifier indicates a QoS flow whose delay measurement result is carried in the current packet. DL Sending Time Stamp Repeated may be the foregoing T1, DL Received Time Stamp is the foregoing T2, and UL Sending Time Stamp may be the foregoing T3.

Optionally, the access network device sends the indication information to the core network device, to indicate whether the terminal device supports the measurement of the terminal side delay, or indicate whether the delay information includes the terminal side delay.

In an implementation, the indication information, for example, a D1 indicator (D1 Ind. for short) in FIG. 6, may be carried in the packet in which the delay information is located. The D1 Ind. indicates whether the terminal device supports the measurement of the terminal side delay, or indicates whether the delay information includes the terminal side delay. Another meaning of the indication information may indicate whether the UL Delay Result includes a value of D1. Another meaning of the indication information may indicate whether the packet carries the value of D1. For example, in addition to the UL Delay Result in the packet, some bits in the packet identify the value of D1 separately. For example, in this case, the UL Delay Result includes only a value of D2. In another feasible manner, it may be learned from step 502 that the indication information may alternatively be carried in the delay measurement information-based response. It may be understood that, during actual operation, the access network device may send the indication information to the core network device by using another message. For example, the access network device sends the indication information to the core network device by using an initial user equipment message or a user equipment radio capability information indication, and a sending occasion of the indication information is not limited herein.

When the terminal device does not support the measurement of the terminal side delay, in a feasible manner, the access network device may obtain a value of the terminal side delay through estimation, or the terminal device estimates a value of the terminal side delay based on a capability of the terminal device and reports the value to the access network device. This is not specifically limited herein.

It may be understood that there are a plurality of specific forms of the indication information. In an implementation, the indication information includes first indication information and/or second indication information, where the first indication information indicates that the terminal device supports the measurement of the terminal side delay or the delay information includes the terminal side delay, and the second indication information indicates that the terminal device does not support the measurement of the terminal side delay or the delay information does not include the terminal side delay. During actual operation, the indication information may include only the first indication information. When receiving the first indication information, the core network device determines that the terminal device supports the measurement of the terminal side delay or the delay information includes the terminal side delay. Otherwise, when the core network device does not receive the first indication information, the core network device determines that the terminal device does not support the measurement of the terminal side delay or the delay information does not include the terminal side delay. A specific form of the indication information is not limited in this embodiment of this application.

That the access network device triggers the measurement of the delay of the data transmission between the terminal device and the access network device may be as follows: The access network device triggers notifying the terminal device to perform delay measurement after receiving an immediate minimization of drive tests MDT (immediate minimization of drive tests, immediate MDT) notification sent by the core network device or an operation, administration and maintenance (OAM) device.

Figure 7:
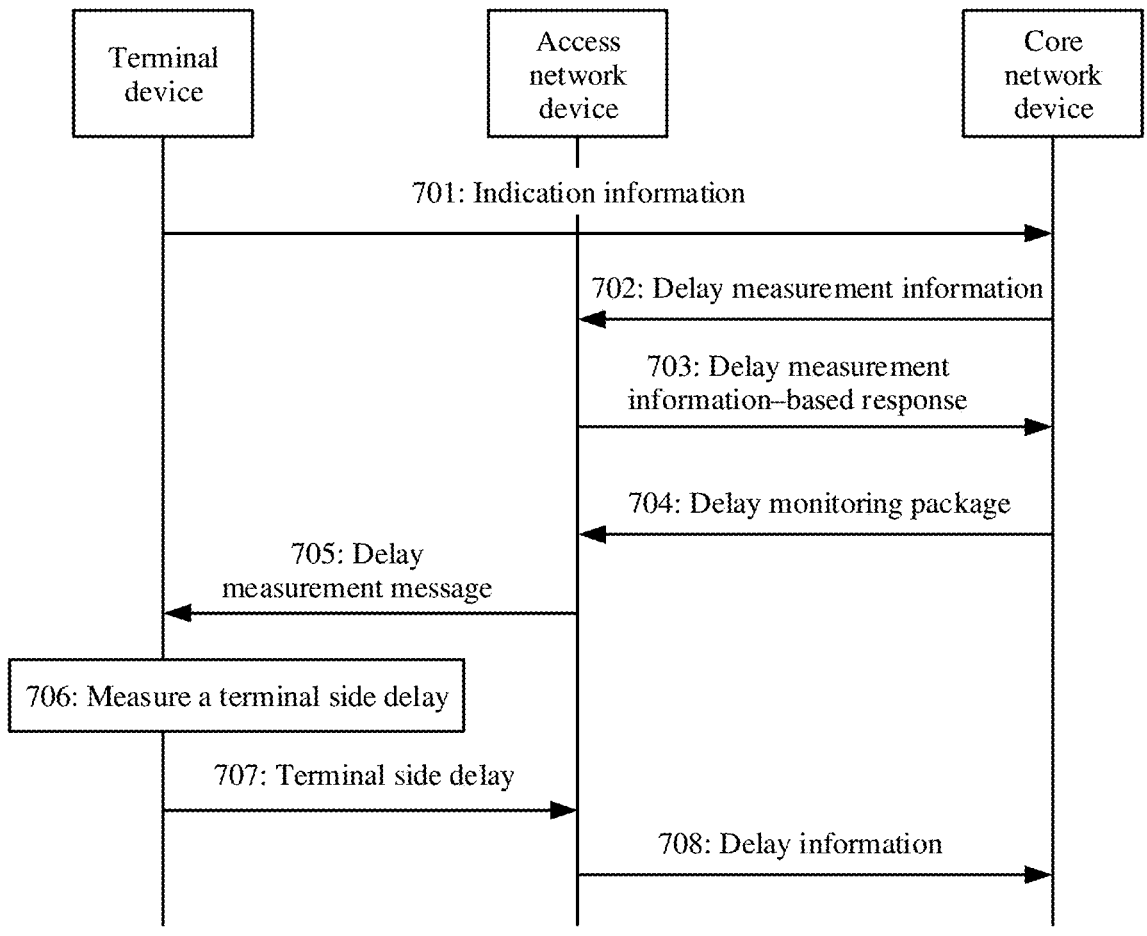
FIG. 7 is another schematic flowchart of an information transmission method according to an embodiment of this application.

The foregoing embodiment mainly describes a case in which the indication information is sent by the access network device. It may be understood that the indication information may be directly sent by the terminal device to the core network device, to indicate whether the terminal device supports the measurement of the terminal side delay, or indicate whether the delay information includes the terminal side delay. Refer to FIG. 7, a procedure of an information transmission method includes steps 701 to 708. Details are as follows:

701: A terminal device sends indication information to a core network device.

The indication information indicates whether the terminal device supports measurement of a terminal side delay, or indicates whether delay information includes the terminal side delay. The terminal device may include the indication information in a non-access stratum NAS message sent to the core network device.

It may be understood that there are a plurality of specific forms of the indication information. In an implementation, the indication information includes third indication information and/or fourth indication information, where the third indication information indicates that the terminal device supports the measurement of the terminal side delay or the delay information includes the terminal side delay, and the fourth indication information indicates that the terminal device does not support the measurement of the terminal side delay or the delay information does not include the terminal side delay. During actual operation, the indication information may include only the third indication information. When receiving the third indication information, the core network device determines that the terminal device supports the measurement of the terminal side delay or the delay information includes the terminal side delay; otherwise, when the core network device does not receive the third indication information, the core network device determines that the terminal device does not support the measurement of the terminal side delay or the delay information does not include the terminal side delay. A specific form of the indication information is not limited in this embodiment of this application.

702: The core network device sends delay measurement information to an access network device.

703: The access network device sends a delay measurement information—based response to the core network device.

704: The core network device sends a delay detection packet to the access network device.

705: The access network device sends a delay measurement message to the terminal device.

706: The terminal device measures the terminal side delay.

707: The terminal device sends the terminal side delay to the access network device.

708: The access network device sends the delay information to the core network device.

This implementation (the implementation shown in FIG. 7) is similar to the implementation corresponding to FIG. 5. The indication information in the implementation shown in FIG. 5 may be carried in a control plane message (for example, the delay measurement information-based response) sent by the access network device to the core network device, or may be carried in user plane data (a packet in which the delay information is located) sent by the access network device to the core network device. In this implementation, the indication information is directly sent by the terminal device to the core network device (for example, step 701). It may be understood that there is no time sequence relationship between this step and step 702 to step 707. Step 702 to step 708 in this implementation are similar to step 501 to step 507 in the embodiment shown in FIG. 5. Details are not described herein again.

Figures 8, 9:
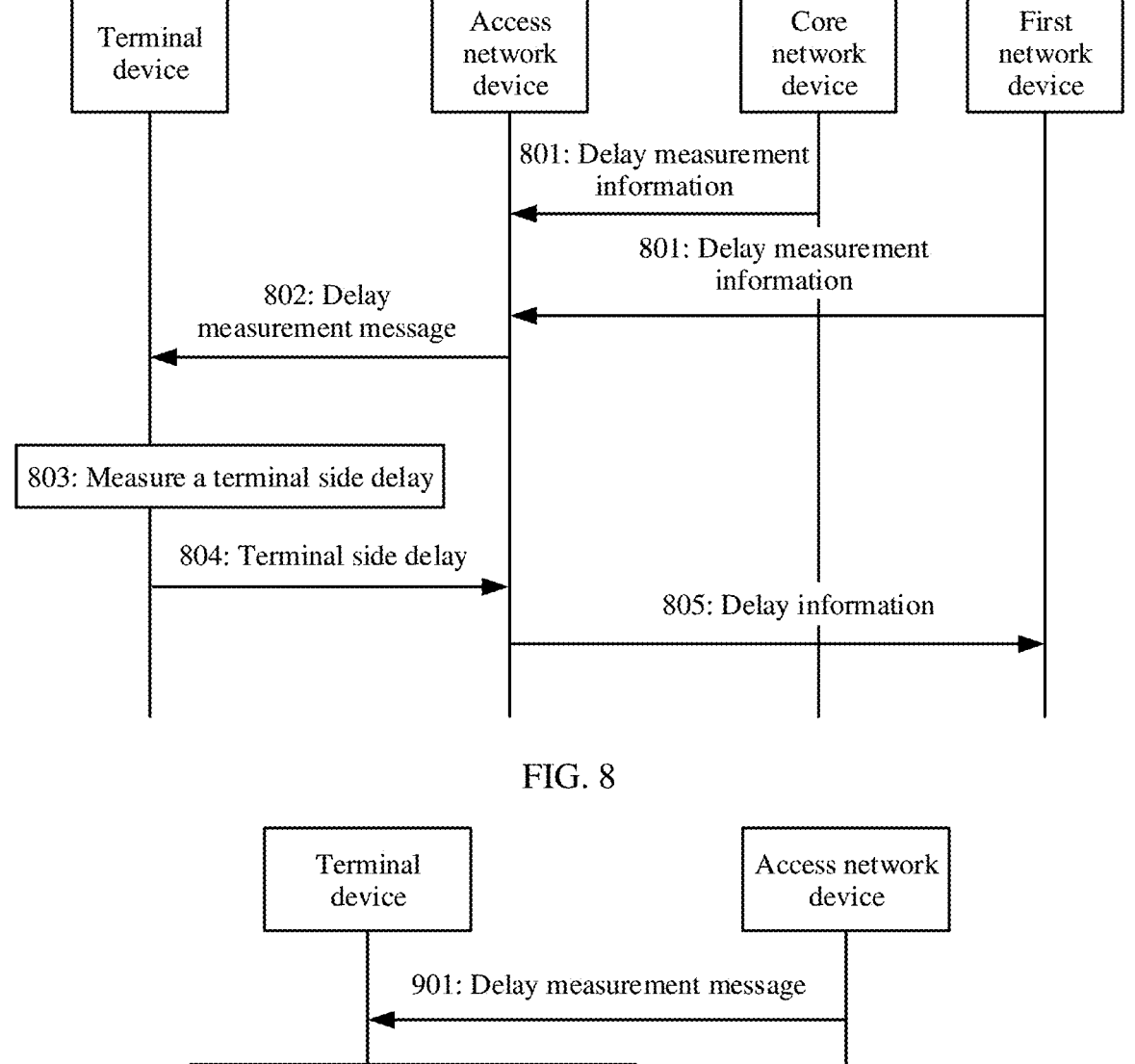
FIG. 8 is another schematic flowchart of an information transmission method according to an embodiment of this application.
FIG. 9 is another schematic flowchart of an information transmission method according to an embodiment of this application.

A basic idea of an MDT technology is that an operator replaces some conventional drive test work with measurement reporting that is performed by a commercial terminal of a subscribed user, to automatically collect terminal device measurement data, so as to detect and optimize a problem and a fault in a wireless network. In immediate MDT, terminal device measurement data is collected by using a terminal device in a radio resource control connected RRC_ CONNECTED mode. The immediate MDT may be triggered by the core network device (also referred to as signaling-based immediate MDT, where the core network device sends an immediate MDT notification to the access network device), or may be triggered by an OAM device (also referred to as management-based immediate MDT, where the OAM device sends an immediate MDT notification to the access network device). For the immediate MDT, the access network device may further notify the terminal device to measure an uplink delay. Refer to FIG. 8. A procedure of an information transmission method includes steps 801 to 805. Details are as follows:

801: An access network device receives delay measurement information from a core network device or a first network device.

For signaling-based immediate MDT, the core network device may include the delay measurement information in an initial context setup request, a handover request message, or a trace start message. A specific message is not limited herein.

For management-based immediate MDT, the access network device may receive the delay measurement information from an OAM device, and the access network device triggers measurement of a delay of data transmission between the access network device and a terminal device.

802: The access network device sends a delay measurement message to the terminal device.

803: The terminal device measures a terminal side delay.

804: The terminal device sends the terminal side delay to the access network device.

Steps 802 to 804 are similar to steps 504 to 506 in the embodiment shown in FIG. 5. Details are not described herein again.

805: The access network device sends delay information to the first network device.

The access network device sends the delay information to the first network device. The first network device may be an OAM device, a trace collection entity (TCE), or another device. Optionally, the access network device sends indication information to the first network device, to indicate whether the terminal device supports the measurement of the terminal side delay, or indicate whether the delay information includes the terminal side delay. Another meaning of the indication information may indicate whether the delay information carries a value of D1. For example, in addition to a value of D2 described above, the delay information further carries the value of D1 independently. For example, in this case, the values of D1 and D2 are separately indicated.

When the terminal device does not support the measurement of the terminal side delay, in a feasible manner, the access network device may obtain a value of the terminal side delay through estimation; or the terminal device estimates a value of the terminal side delay based on a capability of the terminal device and reports the value to the access network device. This is not specifically limited herein.

It may be understood that there are a plurality of specific forms of the indication information. In an implementation, the indication information includes first indication information and/or second indication information, where the first indication information indicates that the terminal device supports the measurement of the terminal side delay or the delay information includes the terminal side delay, and the second indication information indicates that the terminal device does not support the measurement of the terminal side delay or the delay information does not include the terminal side delay. During actual operation, the indication information may include only the first indication information. When receiving the first indication information, the first network device determines that the terminal device supports the measurement of the terminal side delay or the delay information includes the terminal side delay; otherwise, when the first network device does not receive the first indication information, the first network device determines that the terminal device does not support the measurement of the terminal side delay or the delay information does not include the terminal side delay. A specific form of the indication information is not limited in this embodiment of this application.

In a communication system, a terminal device may access an access network device, and communicate with the access network device. For example, one access network device may manage one or more (for example, three or six) cells, and a terminal device may access the access network device in at least one of the one or more cells, and communicate with the access network device in a cell in which the terminal device is located. In embodiments of this application, "at least one" may be one, two, three, or more. This is not limited in embodiments of this application.

An embodiment of this application provides an information transmission method for how to reduce performance overheads of periodically reporting a terminal side delay. Refer to FIG. 9. A procedure of the information transmission method includes steps 901 to 903. Details are as follows:

901: An access network device sends a delay measurement message to a terminal device.

In this embodiment of this application, the access network device may be triggered to notify the terminal device to perform delay measurement because the access network device receives a delay measurement information notification sent by a core network device; or the access network device is triggered to notify the terminal device to perform delay measurement only because the access network device receives an immediate minimization of drive tests (MDT) (immediate MDT) notification sent by a core network device or an operation, administration and maintenance (OAM) device; or the access network device is triggered to notify the terminal device to perform delay measurement due to another reason. A specific trigger condition is not limited herein.

The delay measurement message may be a radio resource control (radio resource control, RRC) reconfiguration message. To be specific, the access network device notifies, by using the RRC reconfiguration message, the terminal device to measure the terminal side delay. For example, another configuration (otherconfig) or a measurement configuration (measConfig) in the RRC reconfiguration message carries information for notifying the terminal device to perform delay measurement. For example, an identifier for performing delay measurement on a data radio bearer (DRB) is carried, that is, a DRB identifier (ID) is carried.

Optionally, the access network device may notify the terminal device to periodically measure the terminal side delay, and periodically report a corresponding periodic value of the terminal side delay. Duration of one periodicity may be 200 milliseconds, 500 milliseconds, or the like. Duration of one periodicity is not limited in this embodiment of this application.

902: The terminal device measures the terminal side delay.

After receiving the delay measurement message, the terminal device measures the terminal side delay. In a feasible implementation, the terminal device periodically measures the terminal side delay. Duration of one periodicity may be 200 milliseconds, 500 milliseconds, or the like. Duration of one periodicity is not limited in this embodiment of this application.

903: The terminal device sends the terminal side delay to the access network device.

In a scenario in which the terminal side delay does not change greatly, a quantity of times that a terminal device sends terminal side delays to the access network device can be reduced, and the access network device obtains the terminal side delay based on historical data, so that network resources occupied by data transmission are reduced.

For example, the terminal device periodically measures and reports a terminal side delay. It is assumed that a terminal side delay value that currently needs to be reported, namely, a terminal side delay value measured in this periodicity, satisfies a preset delay range. The preset delay range may be obtained based on a terminal side delay reported by the terminal device last time. If the preset delay range is 0.9 to 1.1 times of the terminal side delay reported last time, or a difference between the value that currently needs to be reported and the terminal side delay reported last time is within 1 millisecond, in other words, if the difference between the value that currently needs to be reported and a value of the terminal side delay reported last time is within a delay range, the terminal device may not report a current measurement result; otherwise, the terminal device reports the measured terminal side delay. The delay range may be notified by the access network device to the terminal device (for example, the delay range is carried in the delay measurement information), or the delay range is fixed as specified in a protocol in advance. A manner in which the terminal device obtains the delay range is not limited herein. The access network device may further notify the terminal device whether the terminal device needs to determine whether the value is within the delay range. To be specific, the terminal device is notified to directly report the value or determine whether the difference between the value and the value reported last time is within one delay range.

Optionally, when the terminal device sends a terminal side delay to the access network device for the first time, the terminal device may compare the terminal side delay with an initial value. If a difference between the terminal side delay that currently needs to be reported and the initial value is within a delay range, the terminal device does not need to report a current measurement result; otherwise, the terminal device reports the current measurement result. The initial value may be notified by the access network device to the terminal device (for example, the initial value is carried in the delay measurement message), or the initial value is fixed as specified in a protocol in advance. A manner in which the terminal device obtains the initial value is not limited herein.

Optionally, in this embodiment, the terminal device may compare a terminal side delay reported each time with the initial value. If a difference between a terminal side delay that currently needs to be reported and the initial value is within one delay range, the terminal device does not need to report a current terminal side delay measurement result; otherwise, the terminal device reports the current terminal side delay measurement result.

In a wireless network, one terminal device may communicate with a plurality of access network devices by using a multi-radio dual connectivity (MR-DC) technology. In MR-DC communication, an access network device that exchanges control plane signaling with a core network is referred to as a master node (MN), and another access network device is referred to as a secondary node (SN). The MN includes a master cell group (MCG). The MCG includes at least one PCell, and may further include at least one secondary cell (SCell). All these cells are referred to as MCG serving cells of the terminal device. The SN includes a secondary cell group (SCG). The SCG includes at least one PSCell, and may further include at least one SCell. All these cells are referred to as SCG serving cells of the terminal device. According to different radio access technologies, MR-DC includes, for example, evolved universal terrestrial radio access-new radio dual connectivity (E-UTRA-NR dual connectivity, EN-DC), next-generation radio access node evolved universal terrestrial radio access-new radio dual connectivity (NG-RAN E-UTRA-NR dual connectivity, NGEN-DC), new radio-evolved universal terrestrial radio access dual connectivity (NR-E-UTRA dual connectivity, NE-DC), and new radio-new radio dual connectivity (NR-NR dual connectivity, NR-DC). Both the master node and the secondary node may configure immediate MDT measurement for the terminal device. For management-based immediate MDT, the secondary node may receive delay measurement information of the management -based immediate MDT from an OAM device, and the secondary node measures a delay of data transmission between the secondary node and the terminal device. For management-based MDT, the access network device receives MDT configuration information from the OAM device, where the configuration information includes a trace reference, an IP address of a TCE, and an anonymous transmission requirement. A trace recording session reference identifies a trace recording session in a trace session. The anonymous transmission requirement means that the OAM device or the TCE may need type information that is of the terminal device and that corresponds to a measurement result (for example, a vendor of the terminal device and a type of the terminal device, such as an international mobile equipment identity type allocation code (IMEI type allocation code, IMEI-TAC)). For example, for management-based MDT measurement, the OAM or trace collection entity TCE obtains, through analysis based on the obtained type information of the terminal device and a management-based MDT measurement result of the terminal device, performance of a type of terminal devices, on a network, corresponding to the type information that is of the terminal device and that is related to the measurement result. The access network device selects a corresponding terminal device to perform MDT measurement (for example, depending on whether the terminal device supports corresponding measurement), and the access network device allocates a trace recording session reference to the selected terminal device. The trace reference identifies a trace session and is globally unique. The trace recording session reference identifies a trace recording session in a trace session. The trace session is a time period, where a start point is an activation time point of the trace session, and an end point is a deactivation time point of the trace session. A trace record is data collected through tracing. The trace recording session refers to a time interval at which a trace record is generated in a trace session. However, only the core network can know a type of a terminal device. Therefore, for a result of the MDT measurement configured by the secondary node, the OAM or the TCE may need to learn of type information of the terminal device. This application further provides a method for obtaining type information of a terminal device for management-based MDT measurement performed by an SN. The method may include steps S1001 to S1007.

Details are as follows:

S1001: An SN obtains MDT measurement configuration information from an OAM.

The MDT measurement configuration information includes a trace reference, an IP address of a TCE, and an anonymous transmission requirement. MDT measurement includes immediate MDT measurement, for example, the measurement of the delay of the data transmission between the terminal device and the access network device described above, or other immediate MDT measurement. For example, a terminal device measures downlink signal quality of a cell.

S1002: The SN configures MDT measurement for a terminal device.

The SN selects the terminal device to perform MDT measurement. When the MDT measurement is delay measurement, the SN sends a delay measurement message to the terminal device. A specific method is the same as that described in step 504 in the embodiment shown in FIG. 5. When the MDT measurement is downlink signal quality measurement, the SN sends a measurement message to the terminal device, where the measurement message carries configuration information for enabling the terminal device to perform downlink signal quality measurement.

S1003: The SN obtains an MDT measurement result of the terminal device.

The SN obtains the MDT measurement result corresponding to the terminal device. When the MDT measurement is the delay measurement, a method for sending, by the terminal device, a delay measurement result to the SN is the same as steps 505 and 506 in FIG. 5. When the MDT measurement is the downlink signal quality measurement, the terminal device reports a downlink signal quality measurement result to the SN.

S1004: The SN sends a message to an MN, where the message carries a trace identifier corresponding to the MDT measurement performed by the terminal device, information about the IP address of the TCE, and the like.

When the anonymous transmission requirement indicated in the MDT measurement configuration information obtained by the SN from the OAM is that an IMEI-TAC is required, the message further carries a privacy indicator, where the privacy indicator carries an MDT type, for example, a value is logged MDT or immediate MDT. The trace identifier includes the trace reference and a trace recording session reference.

S1005: The MN sends a message to a core network, where the message carries the trace identifier, the information about the IP address of the TCE, and the like.

The trace identifier and TCE information are information received by the MN from the SN. If the message sent by the SN to the MN carries the privacy indicator in step S1004, the MN also sends the privacy indicator to the core network.

The message further carries an identifier of a current PCell of the terminal device, for example, a cell global identifier (CGI) of the PCell.

S1006: The core network sends a message to the TCE, where the message carries the trace identifier, the information about the IP address of the TCE, and the like.

The trace identifier and the TCE information are information received by the core network from the MN. If the message sent by the MN to the core network carries the privacy indicator in step S1006, the core network searches a database for a corresponding user identifier (for example, an IMEI (SV)), and sends the IMEI-TAC, the trace recording session reference, and the trace reference to the TCE. For immediate MDT, the core network further sends, to the TCE, the identifier, of the PCell, received from the MN.

S1007: The SN sends the MDT measurement result to the TCE.

After obtaining the MDT measurement result, the SN sends the MDT measurement result to the TCE. In addition, the SN sends the identifier, of the PCell, in the MN to the TCE. Optionally, the identifier, of the PCell, in the MN is obtained by the SN from the MN, in other words, the MN sends the identifier of the PCell to the SN. Optionally, the SN further sends an identifier of a serving cell (for example, a CGI of a PSCell) of the terminal device in the SN to the TCE.

According to the foregoing method, the measurement result sent by the SN to the TCE includes the identifier of the PCell, and the TCE obtains the identifier of the PCell and the IMSI-TAC from the core network, so that the TCE can learn of the IMSI-TAC that is of the terminal device and that corresponds to the MDT measurement result obtained from the SN.

Figure 10:
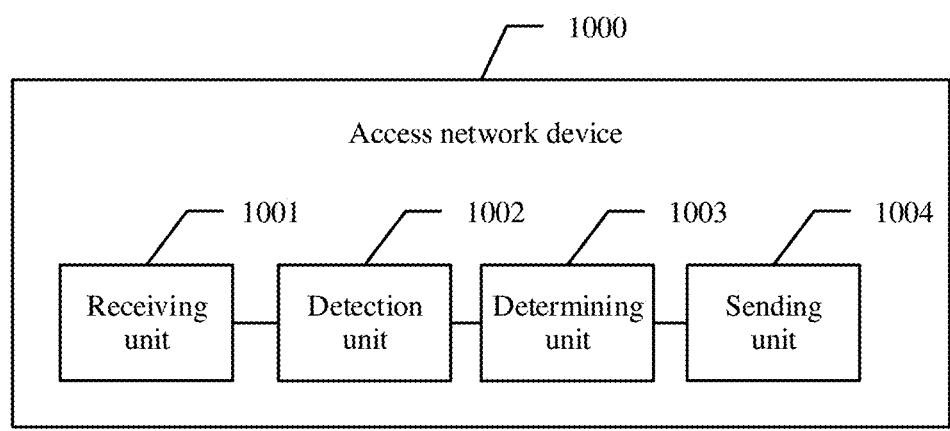
FIG. 10 is a schematic diagram of a structure of an access network device according to an embodiment of this application.

The foregoing describes the information transmission method in embodiments of this application, and the following describes apparatuses in embodiments of this application. Refer to FIG. 10. An embodiment of an access network device 1000 in embodiments of this application includes: a sending unit 1004, configured to send indication information and delay information to a core network device, where the indication information indicates whether a terminal device supports measurement of a terminal side delay, or indicates whether the delay information includes the terminal side delay; a detection unit 1002, configured to detect a delay of data transmission between the terminal device and the access network device, to obtain the delay information; and specifically configured to: if the terminal device supports the measurement of the terminal side delay, send a delay measurement message to the terminal device, where the delay measurement message indicates the terminal device to measure the terminal side delay, and the delay information includes the terminal side delay; a determining unit 1003, configured to: when the access network device determines, within a preset periodicity, that the terminal side delay is received from the terminal device, obtain the delay information based on the terminal side delay received within the preset periodicity; or when the access network device determines, within the preset periodicity, that the terminal side delay is not received from the terminal device, obtain the delay information based on the terminal side delay received beyond the preset periodicity; and a receiving unit 1001, configured to receive delay measurement information from the core network device, where the delay measurement information indicates the access network device to provide the delay information, and the delay information includes the delay of the data transmission between the terminal device and the access network device.

In this embodiment, operations performed by the units in the access network device 1000 are similar to those described in the embodiment shown in FIG. 5. Details are not described herein again.

Figure 11:
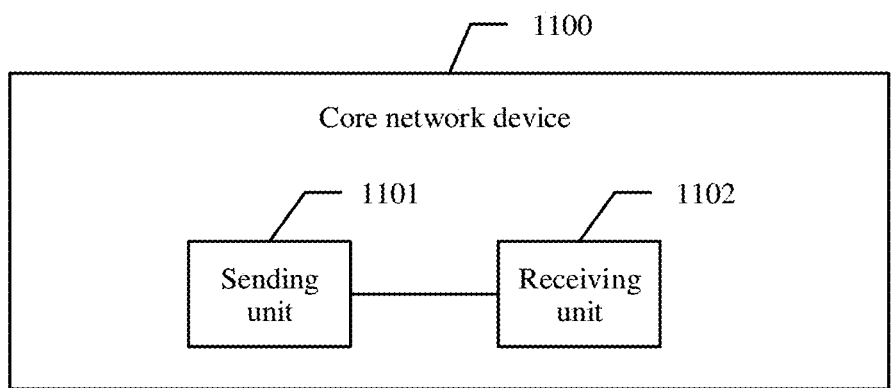
FIG. 11 is a schematic diagram of a structure of a core network device according to an embodiment of this application.

Refer to FIG. 11. An embodiment of a core network device 1100 in embodiments of this application includes: a sending unit 1101, configured to send delay measurement information to an access network device, where the delay measurement information indicates the access network device to provide delay information, and the delay information includes a delay of data transmission between a terminal device and the access network device; and a receiving unit 1102, configured to receive indication information and the delay information from the access network device, where the indication information indicates whether the terminal device supports measurement of a terminal side delay, or indicates whether the delay information includes the terminal side delay.

In this embodiment, operations performed by the units in the core network device 1100 are similar to those described in the embodiment shown in FIG. 5. Details are not described herein again.

Figure 12:
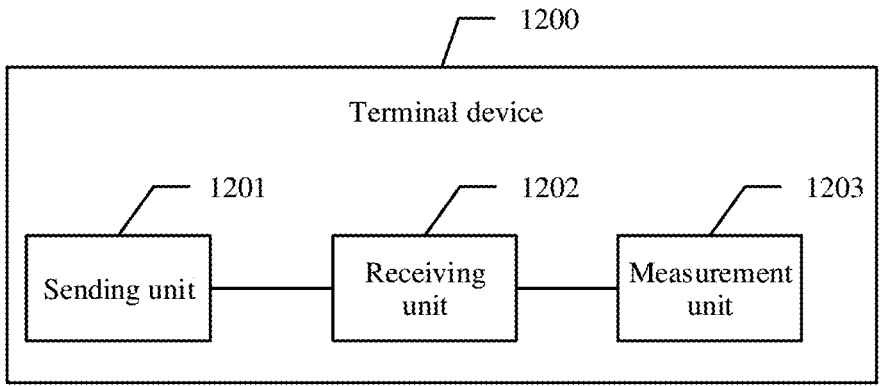
FIG. 12 is a schematic diagram of a structure of a terminal device according to an embodiment of this application.

Refer to FIG. 12. An embodiment of a terminal device 1200 in embodiments of this application includes: a sending unit 1201, configured to send indication information to a core network device, where the indication information indicates whether the terminal device supports measurement of a terminal side delay, or indicates whether delay information includes the terminal side delay, and the delay information includes a delay of data transmission between the terminal device and an access network device; further configured to send the terminal side delay to the access network device; and specifically configured to: when the terminal side delay satisfies a preset condition, send the terminal side delay to the access network device, where the preset condition includes that the terminal side delay is beyond a preset delay range; a receiving unit 1202, configured to: when the indication information indicates that the terminal device supports the measurement of the terminal side delay, or indicates that the delay information includes the terminal side delay, receive a delay measurement message from the access network device; and a measurement unit 1203, configured to measure the terminal side delay.

In this embodiment, operations performed by the units in the terminal device 1200 are similar to those described in the embodiment shown in FIG. 7. Details are not described herein again.

Figure 13:
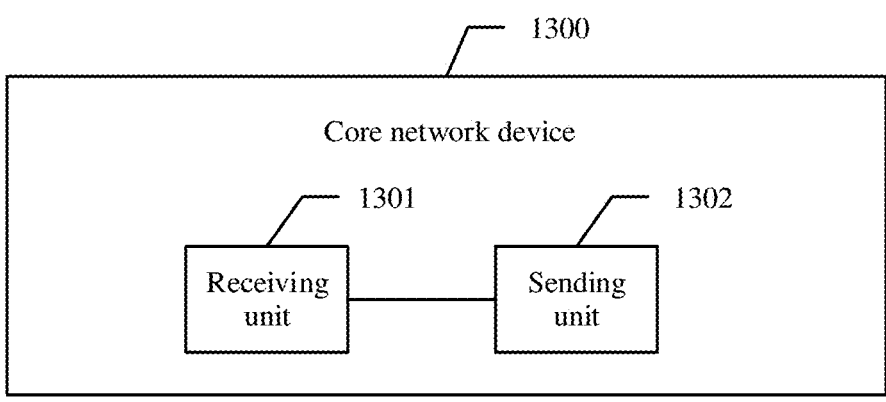
FIG. 13 is another schematic diagram of a structure of a core network device according to an embodiment of this application.

Refer to FIG. 13. Another embodiment of a core network device 1300 in embodiments of this application includes: a receiving unit 1301, configured to receive indication information from a terminal device, where the indication information indicates whether the terminal device supports measurement of a terminal side delay, or indicates whether delay information includes the terminal side delay, and the delay information includes a delay of data transmission between the terminal device and an access network device; and further configured to receive the delay information from the access network device; and a sending unit 1302, configured to send delay measurement information to the access network device, where the delay measurement information indicates the access network device to provide the delay information.

In this embodiment, operations performed by the units in the core network device 1300 are similar to those described in the embodiment shown in FIG. 7. Details are not described herein again.

Figure 14:
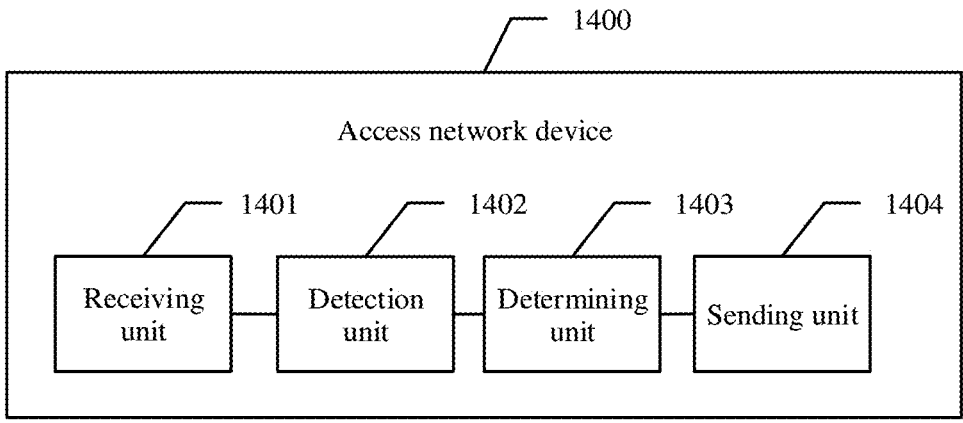
FIG. 14 is another schematic diagram of a structure of an access network device according to an embodiment of this application.

Refer to FIG. 14. Another embodiment of an access network device 1400 in embodiments of this application includes: a receiving unit 1401, configured to receive delay measurement information from a core network device or a first network device, where the delay measurement information indicates the access network device to provide delay information, the delay information includes a delay of data transmission between a terminal device and the access network device, and the first network device includes an OAM device; a detection unit 1402, configured to detect the delay of the data transmission between the terminal device and the access network device, to obtain the delay information; and specifically configured to: if the terminal device supports measurement of a terminal side delay, send a delay measurement message to the terminal device, where the delay measurement message indicates the terminal device to measure the terminal side delay, and the delay information includes the terminal side delay; a determining unit 1403, configured to: when the access network device determines, within a preset periodicity, that the terminal side delay is received from the terminal device, obtain the delay information based on the terminal side delay received within the preset periodicity; or when the access network device determines, within the preset periodicity, that the terminal side delay is not received from the terminal device, obtain the delay information based on the terminal side delay received beyond the preset periodicity; and a sending unit 1404, configured to send indication information and the delay information to the first network device, where the indication information indicates whether the terminal device supports the measurement of the terminal side delay, or indicates whether the delay information includes the terminal side delay;

In this embodiment, operations performed by the units in the access network device 1400 are similar to those described in the embodiment shown in FIG. 8. Details are not described herein again.

Figure 15:
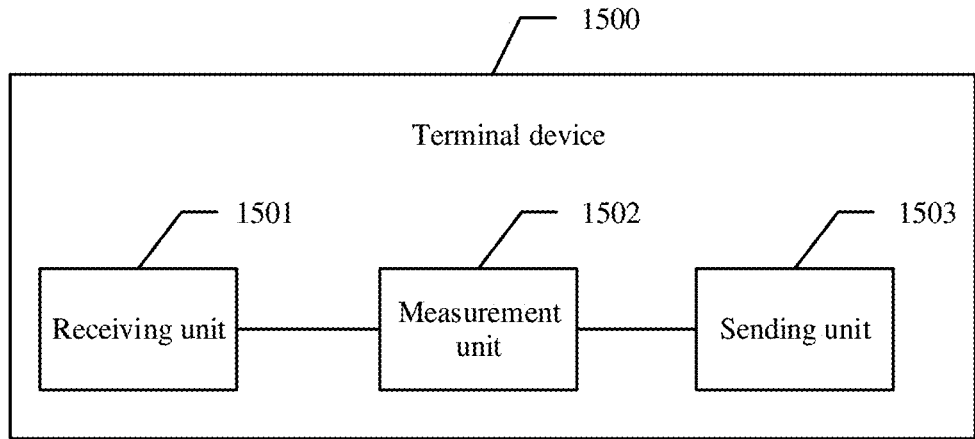
FIG. 15 is another schematic diagram of a structure of a terminal device according to an embodiment of this application.

Refer to FIG. 15. Another embodiment of a terminal device 1500 in embodiments of this application includes: a receiving unit 1501, configured to receive a delay measurement message from an access network device; a measurement unit 1502, configured to measure a terminal side delay; and a sending unit 1503, configured to: when the terminal side delay satisfies a preset condition, send the terminal side delay to the access network device, where the preset condition includes that the terminal side delay is beyond a preset delay range.

In this embodiment, operations performed by the units in the terminal device 1500 are similar to those described in the embodiment shown in FIG. 9. Details are not described herein again.

Figure 16:
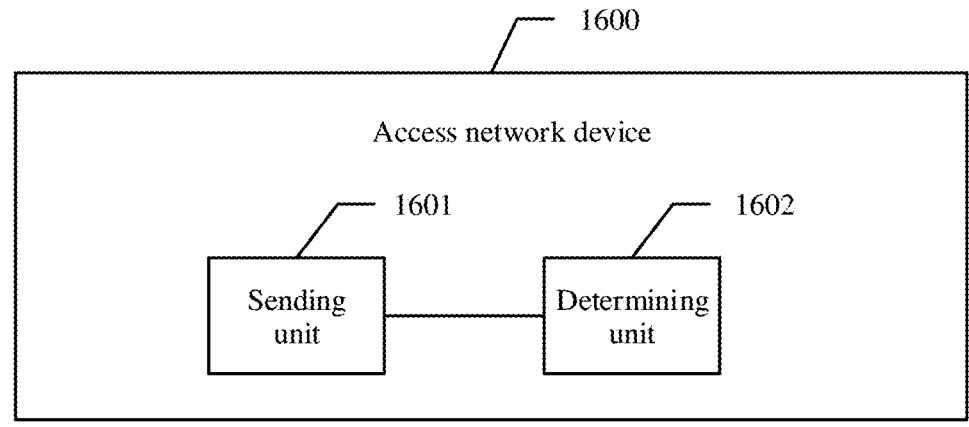
FIG. 16 is another schematic diagram of a structure of an access network device according to an embodiment of this application.

Refer to FIG. 16. Another embodiment of an access network device 1600 in embodiments of this application includes: a sending unit 1601, configured to send a delay measurement message to a terminal device, where the delay measurement message indicates the terminal device to measure a terminal side delay; and is further configured to send delay information to a core network device; and a determining unit 1602, configured to: when the access network device determines, within a preset periodicity, that the terminal side delay is received from the terminal device, obtain the delay information based on the terminal side delay received within the preset periodicity; or when the access network device determines, within the preset periodicity, that the terminal side delay is not received from the terminal device, obtain the delay information based on the terminal side delay received beyond the preset periodicity.

In this embodiment, operations performed by the units in the access network device 1600 are similar to those described in the embodiment shown in FIG. 9. Details are not described herein again.

Figure 17:
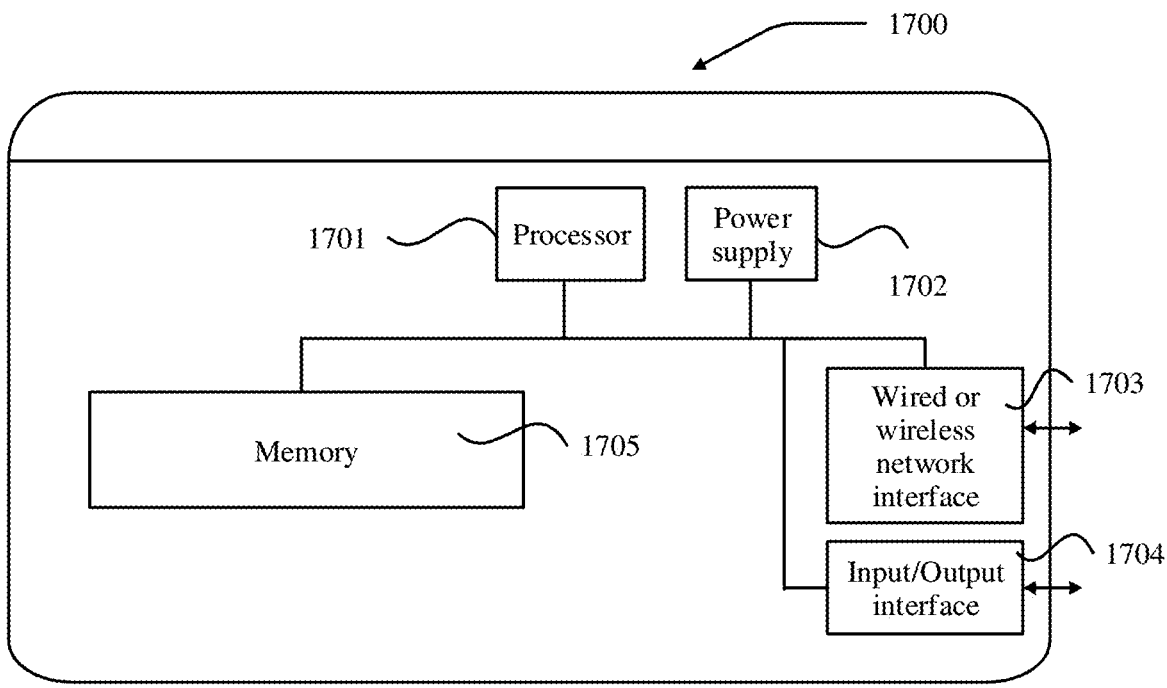
FIG. 17 is another schematic diagram of a structure of an access network device according to an embodiment of this application.

FIG. 17 is a schematic diagram of a structure of an access network device according to an embodiment of this application. The access network device 1700 may include one or more processors 1701 and a memory 1705. The memory 1705 stores one or more application programs or data.

The memory 1705 may be a volatile memory or a persistent memory. The program stored in the memory 1705 may include one or more modules, and each module may include a series of instruction operations for the access network device 1700. Still further, the processor 1701 may be configured to: communicate with the memory 1705, and perform, on the access network device 1700, a series of instruction operations in the memory 1705.

The access network device 1700 may further include one or more power supplies 1702, one or more wired or wireless network interfaces 1703, one or more input/output interfaces 1704, and/or one or more operating systems, for example, any one of the Microsoft operating system (Windows), the Android operating system (Android), the iOS operating system (Mac OS), the Unix operating system (Unix), and the Linux operating system (Linux).

The processor 1701 may perform operations performed by the access network device in any one of the embodiments corresponding to FIG. 5 and FIG. 7 to FIG. 9. Details are not described herein again.

Figure 18:
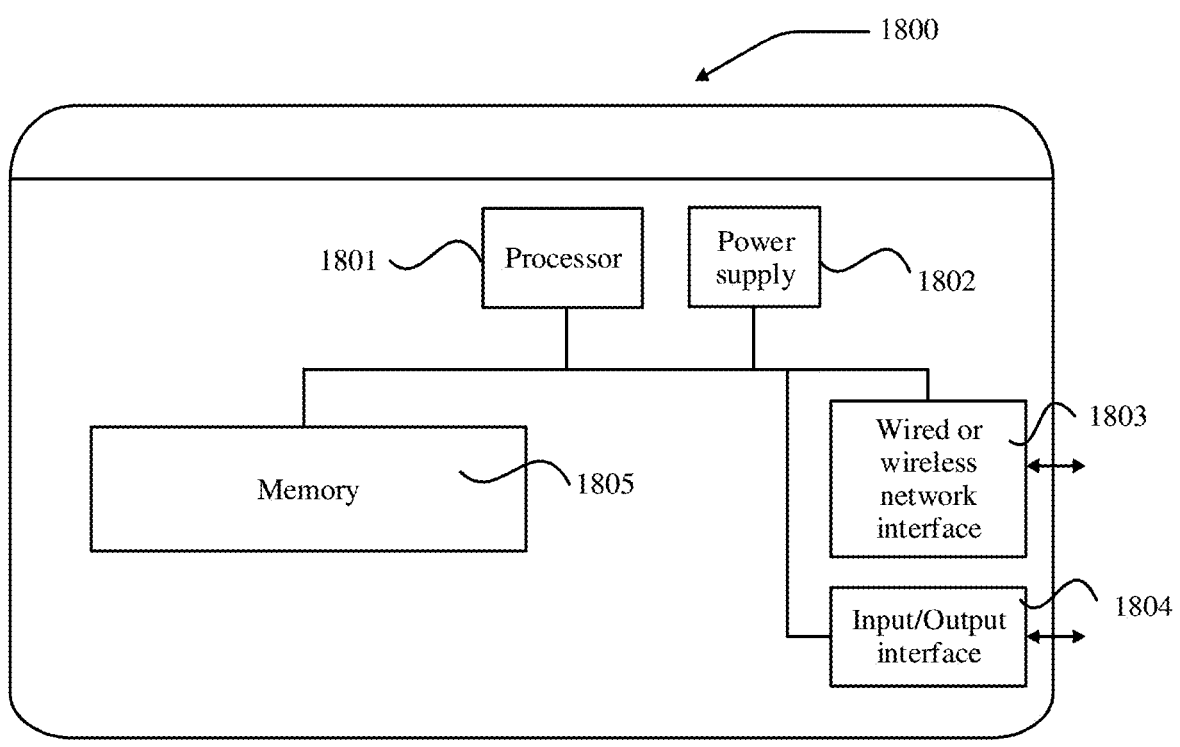
FIG. 18 is another schematic diagram of a structure of a terminal device according to an embodiment of this application.

FIG. 18 is a schematic diagram of a structure of a terminal device according to an embodiment of this application. The terminal device 1800 may include one or more processors 1801 and a memory 1805. The memory 1805 stores one or more application programs or data.

The memory 1805 may be a volatile memory or a persistent memory. The program stored in the memory 1805 may include one or more modules, and each module may include a series of instruction operations for the terminal device 1800. Still further, the processor 1801 may be configured to: communicate with the memory 1805, and perform, on the terminal device 1800, a series of instruction operations in the memory 1805.

The terminal device 1800 may further include one or more power supplies 1802, one or more wired or wireless network interfaces 1803, one or more input/output interfaces 1804, and/or one or more operating systems, for example, any one of the Microsoft operating system (Windows), the Android operating system (Android), the iOS operating system (Mac OS), the Unix operating system (Unix), and the Linux operating system (Linux).

The processor 1801 may perform operations performed by the terminal device in any one of the embodiments corresponding to FIG. 5 and FIG. 7 to FIG. 9. Details are not described herein again.

Figure 19:
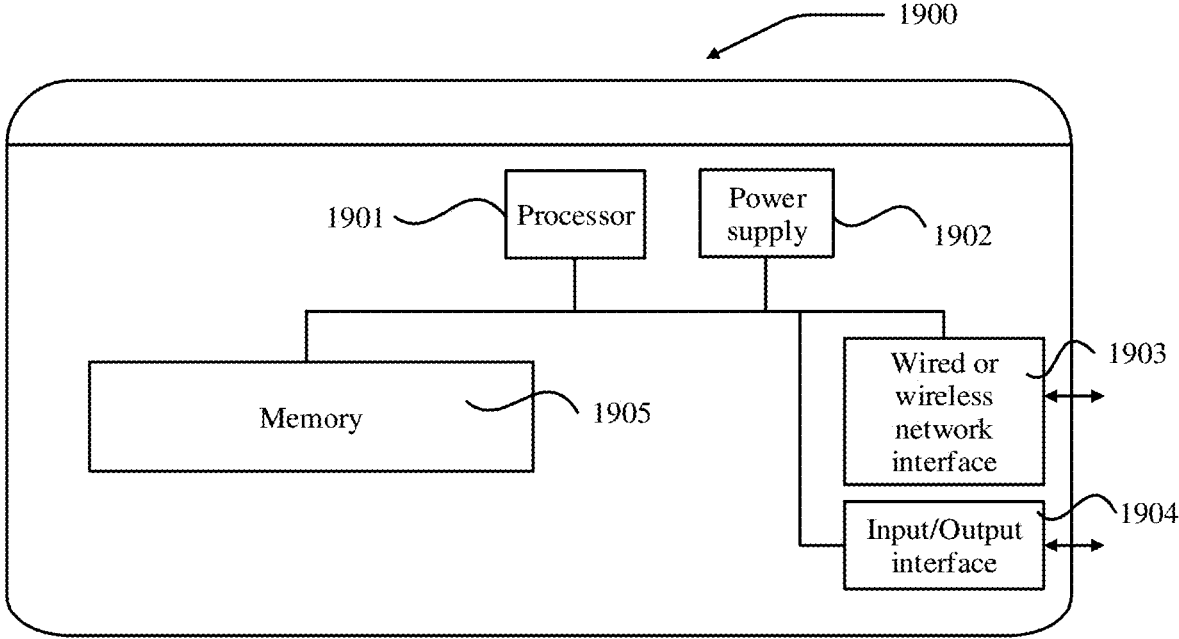
FIG. 19 is another schematic diagram of a structure of a core network device according to an embodiment of this application.

FIG. 19 is a schematic diagram of a structure of a core network device according to an embodiment of this application. The core network device 1900 may include one or more processors 1901 and a memory 1905. The memory 1905 stores one or more application programs or data.

The memory 1905 may be a volatile memory or a persistent memory. The program stored in the memory 1905 may include one or more modules, and each module may include a series of instruction operations for the core network device 1900. Still further, the processor 1901 may be configured to: communicate with the memory 1905, and perform, on the core network device 1900, a series of instruction operations in the memory 1905.

The core network device 1900 may further include one or more power supplies 1902, one or more wired or wireless network interfaces 1903, one or more input/output interfaces 1904, and/or one or more operating systems, for example, any one of the Microsoft operating system (Windows), the Android operating system (Android), the iOS operating system (Mac OS), the Unix operating system (Unix), and the Linux operating system (Linux).

The processor 1901 may perform operations performed by the core network device in any one of the embodiments corresponding to FIG. 5 and FIG. 7 to FIG. 9. Details are not described herein again.

Figure 20:
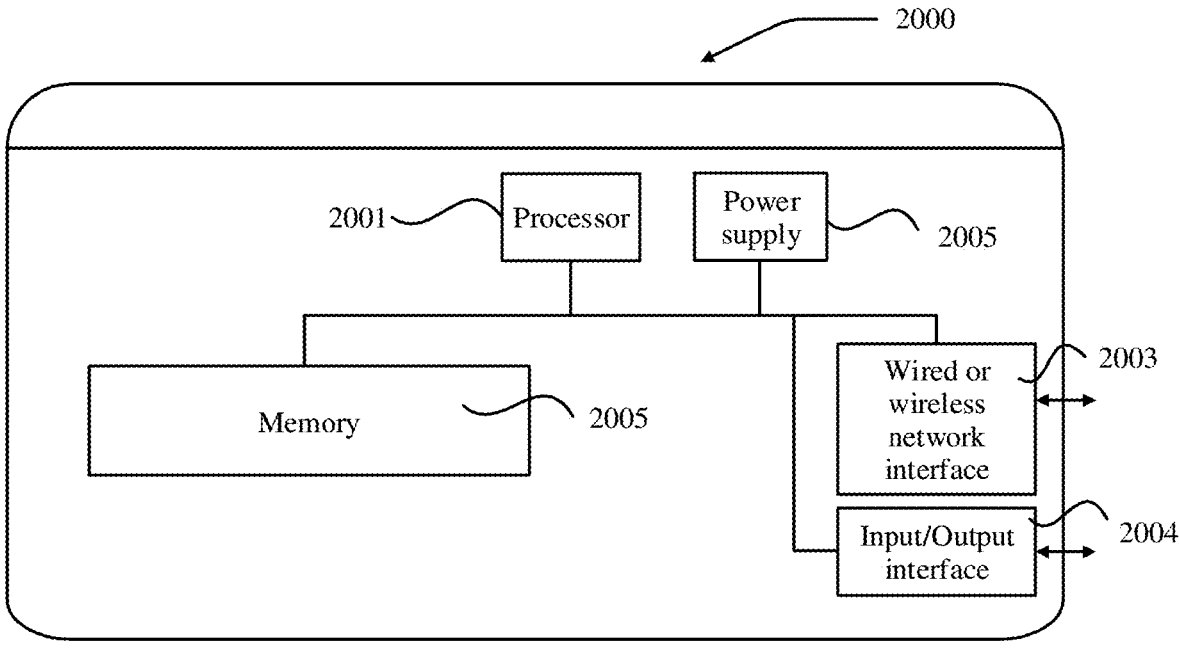
FIG. 20 is a schematic diagram of a structure of a first network device according to an embodiment of this application.

FIG. 20 is a schematic diagram of a structure of a first network device according to an embodiment of this application. The first network device 2000 may include one or more processors 2001 and a memory 2005. The memory 2005 stores one or more application programs or data.

The memory 2005 may be a volatile memory or a persistent memory. The program stored in the memory 2005 may include one or more modules, and each module may include a series of instruction operations for the first network device 2000. Still further, the processor 2001 may be configured to: communicate with the memory 2005, and perform, on the first network device 2000, a series of instruction operations in the memory 2005.

The first network device 2000 may further include one or more power supplies 2002, one or more wired or wireless network interfaces 2003, one or more input/output interfaces 2004, and/or one or more operating systems, for example, any one of the Microsoft operating system (Windows), the Android operating system (Android), the iOS operating system (Mac OS), the Unix operating system (Unix), and the Linux operating system (Linux).

The processor 2001 may perform operations performed by the first network device in any one of the embodiments corresponding to FIG. 5 and FIG. 7 to FIG. 9. Details are not described herein again.

This application provides a core network device. The core network device may include devices such as a control plane device and a user plane device. The core network device may be coupled to a memory, and is configured to read and execute instructions stored in the memory, so that the core network device implements the steps of the method performed by the core network device in any implementation in FIG. 5, FIG. 7, or FIG. 8. In a possible design, the core network device is a chip or a system on chip.

This application provides an access network device. The access network device may be coupled to a memory, and is configured to read and execute instructions stored in the memory, so that the access network device implements the steps of the method performed by the access network device in any implementation in FIG. 5 or FIG. 7 to FIG. 9. In a possible design, the access network device is a chip or a system on chip.

This application provides a terminal device. The terminal device may be coupled to a memory, and is configured to read and execute instructions stored in the memory, so that the terminal device implements the steps of the method performed by the terminal device in any implementation in FIG. 5 or FIG. 7 to FIG. 9. In a possible design, the terminal device is a chip or a system on chip.

The access network device, the core network device, and the terminal device may be deployed on land, where the deployment includes indoor, outdoor, handheld, or vehicle-mounted deployment; may be deployed on water; or may be deployed on an airplane, a balloon, or an artificial satellite in the air. Application scenarios of the access network device, the core network device, and the terminal device are not limited in embodiments of this application.

Communication between the access network device, the core network device, and the terminal device may be performed by using a licensed spectrum, may be performed by using an unlicensed spectrum, or may be performed by using both a licensed spectrum and an unlicensed spectrum. The communication between the network device and the terminal device may be performed by using a spectrum below 6 gigahertz (GHz), may be performed by using a spectrum above 6 GHz, or may be performed by using both a spectrum below 6 GHz and a spectrum above 6 GHz. A spectrum resource used between the network device and the terminal device is not limited in embodiments of this application.

This application provides a chip system. The chip system includes a processor, configured to support a core network device to implement a function in the foregoing aspect, for example, sending or processing data and/or information in the foregoing method. In a possible design, the chip system further includes a memory. The memory is configured to store necessary program instructions and necessary data. The chip system may include a chip, or may include the chip and another discrete component.

This application provides a chip system. The chip system includes a processor, configured to support an access network device to implement a function in the foregoing aspect, for example, sending or processing data and/or information in the foregoing method. In a possible design, the chip system further includes a memory. The memory is configured to store necessary program instructions and necessary data. The chip system may include a chip, or may include the chip and another discrete component.

This application provides a chip system. The chip system includes a processor, configured to support a terminal device to implement a function in the foregoing aspect, for example, sending or processing data and/or information in the foregoing method. In a possible design, the chip system further includes a memory. The memory is configured to store necessary program instructions and necessary data.

The chip system may include a chip, or may include the chip and another discrete component.

In another possible design, when the chip system is a chip in a core network device, an access network device, or a terminal device, the chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in the core network device, the access network device, the terminal device, or the like performs the steps of the method performed by the core network device, the access network device, or the terminal device in any embodiment in FIG. 5 or FIG. 7 to FIG. 9. Optionally, the storage unit is a storage unit in the chip, such as a register or a buffer, or the storage unit may be a storage unit in UE or a base station device but outside the chip, such as a read-only memory (ROM), another type of static storage device capable of storing static information and instructions, or a random access memory (RAM).

An embodiment of this application further provides a core network device. The core network device may perform wireless communication with a server through a link. The core network device includes one or more processors, one or more memories, and one or more transceivers (where each transceiver includes a transmitter Tx and a receiver Rx) that are connected through a bus. The one or more transceivers are connected to one or more antennas. The one or more memories include computer program code. The transceiver may implement a function of a receiving unit or a sending unit of the core network device, or the transceiver may be a separate receiver and a separate transmitter.

An embodiment of this application further provides an access network device. The access network device may perform wireless communication with a server through a link. The access network device includes one or more processors, one or more memories, and one or more transceivers (where each transceiver includes a transmitter Tx and a receiver Rx) that are connected through a bus. The one or more transceivers are connected to one or more antennas. The one or more memories include computer program code. The transceiver may implement a function of a receiving unit or a sending unit of the access network device, or the transceiver may be a separate receiver and a separate transmitter.

An embodiment of this application further provides a terminal device. The terminal device may perform wireless communication with a server through a link. The terminal device includes one or more processors, one or more memories, and one or more transceivers (where each transceiver includes a transmitter Tx and a receiver Rx) that are connected through a bus. The one or more transceivers are connected to one or more antennas. The one or more memories include computer program code. The transceiver may implement a function of a receiving unit or a sending unit of the terminal device, or the transceiver may be a separate receiver and a separate transmitter.

An embodiment of this application further provides a processor, configured to be coupled to a memory, to perform the method and the function related to the core network device in any one of the foregoing embodiments.

An embodiment of this application further provides a processor, configured to be coupled to a memory, to perform the method and the function related to the access network device in any one of the foregoing embodiments.

An embodiment of this application further provides a processor, configured to be coupled to a memory, to perform the method and the function related to the terminal device in any one of the foregoing embodiments.

An embodiment of this application further provides a computer-readable storage medium. The computer-readable storage medium stores a computer program. When the computer program is executed by a computer, the method procedure related to the core network device, the access network device, or the terminal device in any one of the foregoing method embodiments is implemented. Correspondingly, the computer may be the foregoing core network device, access network device, or terminal device.

It should be understood that the processor mentioned in the core network device, the access network device, the terminal device, the chip system, or the like in the foregoing embodiments of this application, or the processor provided in the foregoing embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should be further understood that there may be one or more processors in the core network device, the access network device, the terminal device, the chip system, or the like in the foregoing embodiments of this application. The quantity may be adjusted based on an actual application scenario. This is merely an example for description herein, and does not constitute a limitation. There may be one or more memories in embodiments of this application. The quantity may be adjusted based on an actual application scenario. This is merely an example for description herein, and does not constitute a limitation.

It should be further understood that in embodiments of this application, the memory, the readable storage medium, or the like mentioned in the core network device, the access network device, the terminal device, the chip system, or the like in the foregoing embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM) that is used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be further noted that when the core network device, the access network device, or the terminal device includes the processor (or a processing unit) and the memory, the processor in this application may be integrated with the memory, or may be connected to the memory through an interface. This may be adjusted based on an actual application scenario, and does not constitute a limitation.

An embodiment of this application further provides a computer program or a computer program product including a computer program. When the computer program is executed on a computer, the computer is enabled to implement the method procedure related to the core network device, the access network device, or the terminal device in any one of the foregoing method embodiments. Correspondingly, the computer may be the foregoing core network device, access network device, or terminal device.

All or some of the foregoing embodiments in FIG. 5 or FIG. 7 to FIG. 9 may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like. This is not specifically limited herein.

It can be clearly understood by persons skilled in the art that, for a purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium, and includes several instructions for enabling a computer device (which may be a personal computer, a server, or another network device) to perform all or some of the steps of the methods in the embodiments in FIG. 2 to FIG. 9 of this application. The storage medium includes various media that can store the program code, such as a USB flash drive, a removable hard disk, a read-only memory (ROM), a random access memory (RAM), a magnetic disk, or an optical disc.

In the specification, claims, and accompanying drawings of this application, the terms "first", "second", "third", "fourth", and the like are intended to distinguish similar objects but do not need to be used to describe a specific order or sequence. It should be understood that the terms used in such a way are interchangeable in appropriate circumstances, and this is merely a discrimination manner for describing objects having a same attribute in embodiments of this application. In addition, the terms "include", "contain" and any other variants mean to cover non-exclusive inclusion, so that a process, method, system, product, or device that includes a series of units is not necessarily limited to those units, but may include other units not expressly listed or inherent to such a process, method, system, product, or device.

Names of messages/frames/information, modules, units, or the like provided in embodiments of this application are merely examples, and other names may be used provided that the messages/frames/information, modules, units, or the like have same functions.

The terms used in embodiments of this application are merely for the purpose of illustrating specific embodiments, and are not intended to limit the present invention. Terms "a" and "the" of singular forms used in embodiments of this application are also intended to include plural forms, unless otherwise specified in a context clearly. It should be further understood that, in the descriptions of this application, "/" represents an "or" relationship between associated objects, unless otherwise specified. For example, A/B may represent A or B. A term "and/or" in this application is merely an association relationship between associated objects, and represents that three relationships may exist. For example, A and/or B may represent the following three cases: Only A exists, both A and B exist, and only B exists, where A and B each may be singular or plural. This is not specifically limited herein.

The technical solutions provided in embodiments of this application may be applied to communication between communication devices. The communication between communication devices may include communication between a network device and a terminal device, communication between network devices, and/or communication between terminal devices. In embodiments of this application, the term "communication" may also be described as "transmission", "information transmission", "signal transmission", or the like. The transmission may include sending and/or receiving. In embodiments of this application, the communication between a network device and a terminal device is used as an example to describe the technical solutions. Persons skilled in the art may also apply the technical solutions to other communication between a scheduling entity and a subordinate entity, for example, communication between a macro base station and a micro base station, for example, communication between a first terminal device and a second terminal device. The scheduling entity may allocate air interface resources to the subordinate entity. The air interface resources include one or more of the following resources: time-domain resources, frequency-domain resources, code resources, and spatial resources. In embodiments of this application, "a plurality of" may be two, three, four, or more. This is not limited in embodiments of this application.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof. However, these modifications or replacements do not make the essence of the corresponding technical solutions depart from the scope of the technical solutions of the foregoing embodiments of this application.

What is claimed is:

1. A method, comprising:

receiving, by an access network device, delay measurement information from a core network device, wherein the delay measurement information indicates to the access network device to provide delay information to the core network device, and the delay information comprises a delay of data transmission between a terminal device and the access network device; and sending, by the access network device, indication information and the delay information to the core network device, wherein the indication information indicates whether the delay information comprises terminal side delay, wherein the terminal side delay comprises an uplink terminal side delay, the uplink terminal side delay indicates a packet data convergence protocol (PDCP) buffer delay on the terminal side, wherein the PDCP buffer delay is a time period at the terminal device and is from a time point at which a data packet arrives from an upper layer of a PDCP layer to a time point at which an uplink grant for transmitting the data packet is available, and the time period includes a delay from a time point at which the terminal device sends a scheduling request or performs random access to the time point at which the terminal device gets the uplink grant.

2. The method according to claim 1, further comprising:

detecting, by the access network device, the delay of the data transmission between the terminal device and the access network device, the detecting comprising:

when the terminal device supports measurement of the terminal side delay, sending, by the access network device, a delay measurement message to the terminal device, wherein the delay measurement message indicates to the terminal device to measure the terminal side delay, and the delay information comprises the terminal side delay.

3. The method according to claim 1, wherein:

the indication information is carried in a control plane message sent from the access network device to the core network device; or the indication in formation is carried in user plane data sent from the access network device to the core network device.

4. The method according to claim 1, wherein the indication information comprises first indication information or second indication information, the first indication information indicates that the terminal device supports measurement of the terminal side delay or that the delay information comprises the terminal side delay, and the second indication information indicates that the terminal device does not support the measurement of the terminal side delay or the delay information does not comprise the terminal side delay.

5. The method according to claim 1, wherein the delay of data transmission between the terminal device and the access network device is an uplink delay result.

6. The method according to claim 1, wherein the delay measurement information comprises a quality of service (QoS) monitoring request.

7. A method, comprising:

sending, by a core network device, delay measurement information to an access network device, wherein the delay measurement information indicates to the access network device to provide delay information to the core network device, and the delay information comprises a delay of data transmission between a terminal device and the access network device; and receiving, by the core network device, indication information and the delay information from the access network device, wherein the indication information indicates whether the delay information comprises terminal side delay, wherein the terminal side delay comprises an uplink terminal side delay, the uplink terminal side delay indicates a packet data convergence protocol (PDCP) buffer delay on the terminal side, wherein the PDCP buffer delay is a time period at the terminal device and is from a time point at which a data packet arrives from an upper layer of a PDCP layer to a time point at which an uplink grant for transmitting the data packet is available, and the time period includes a delay from a time point at which the terminal device sends a scheduling request or performs random access to the time point at which the terminal device gets the uplink grant.

8. The method according to claim 7, wherein:

the indication information is carried in a control plane message sent from the access network device to the core network device; or the indication information is carried in user plane data sent from the access network device to the core network device.

9. The method according to claim 7, wherein the indication information comprises first indication information or second indication information, the first indication information indicates that the terminal device supports measurement of the terminal side delay or the delay information comprises the terminal side delay, and the second indication information indicates that the terminal device does not support the measurement of the terminal side delay or the delay information does not comprise the terminal side delay.

10. The method according to claim 7, wherein the delay measurement information comprises a quality of service (QoS) monitoring request.

11. An access network device, comprising:

at least one processor; and a transmission interface, configured to receive or send data; and wherein the at least one processor is configured to invoke software instructions stored in non-transitory memory to cause the access network device to perform the following:

receiving, using the transmission interface, delay measurement information from a core network device, wherein the delay measurement information indicates to the access network device to provide delay information to the core network device, and the delay information comprises a delay of data transmission between a terminal device and the access network device; and sending, using the transmission interface, indication information and the delay information to the core network device, wherein the indication information indicates whether the delay information comprises terminal side delay, wherein the terminal side delay comprises an uplink terminal side delay, the uplink terminal side delay indicates a packet data convergence protocol (PDCP) buffer delay on the terminal side, wherein the PDCP buffer delay is a time period at the terminal device and is from a time point at which a data packet arrives from an upper layer of a PDCP layer to a time point at which an uplink grant for transmitting the data packet is available, and the time period includes a delay from a time point at which the terminal device sends a scheduling request or performs random access to the time point at which the terminal device gets the uplink grant.

12. The access network device according to claim 11, wherein invoking the software instructions stored in the non-transitory memory causes the access network device to perform the following:

when the terminal device supports measurement of the terminal side delay, send a delay measurement message to the terminal device, wherein the delay measurement message indicates the terminal device to measure the terminal side delay, and the delay information comprises the terminal side delay.

13. The access network device according to claim 11, wherein:

the indication information is carried in a control plane message sent from the access network device to the core network device; or the indication information is carried in user plane data sent from the access network device to the core network device.

14. The access network device according to claim 11, wherein the indication information comprises first indication information or second indication information, the first indication information indicates that the terminal device supports measurement of the terminal side delay or the delay information comprises the terminal side delay, and the second indication information indicates that the terminal device does not support the measurement of the terminal side delay or the delay information does not comprise the terminal side delay.

15. The access network device according to claim 11, wherein the delay measurement information comprises a quality of service (QoS) monitoring request.

16. A communication system, comprising:

a core network device; and an access network device; wherein the core network device is configured to:

send delay measurement information to the access network device, wherein the delay measurement information indicates to the access network device to provide delay information to the core network device, and the delay information comprises a delay of data transmission between a terminal device and the access network device; and receive indication information and the delay information from the access network device, wherein the indication information indicates whether the delay information comprises terminal side delay, wherein the terminal side delay comprises an uplink terminal side delay, the uplink terminal side delay indicates a packet data convergence protocol (PDCP) buffer delay on the terminal side, wherein the PDCP buffer delay is a time period at the terminal device and is from a time point at which a data packet arrives from an upper layer of a PDCP layer to a time point at which an uplink grant for transmitting the data packet is available, and the time period includes a delay from a time point at which the terminal device sends a scheduling request or performs random access to the time point at which the terminal device gets the uplink grant.

17. The system according to claim 16, wherein:

the indication information is carried in a control plane message sent from the access network device to the core network device; or the indication information is carried in user plane data sent from the access network device to the core network device.

18. The system according to claim 16, wherein the indication information comprises first indication information or second indication information, the first indication information indicates that the terminal device supports measurement of the terminal side delay or the delay information comprises the terminal side delay, and the second indication information indicates that the terminal device does not support the measurement of the terminal side delay or the delay information does not comprise the terminal side delay.

19. The system according to claim 16, wherein the delay measurement information comprises a quality of service (QoS) monitoring request.

* * * * *